United States Patent
Yamamoto et al.

(10) Patent No.: US 8,324,828 B2
(45) Date of Patent: Dec. 4, 2012

(54) HIGH-PRESSURE DISCHARGE LAMP LIGHTING DEVICE, HIGH PRESSURE DISCHARGE LAMP APPARATUS USING THIS, PROJECTOR USING THE HIGH-PRESSURE DISCHARGE LAMP APPARATUS, AND HIGH-PRESSURE DISCHARGE LAMP LIGHTING METHOD

(75) Inventors: Masahiro Yamamoto, Osaka (JP); Syunsuke Ono, Osaka (JP); Minoru Ozasa, Kyoto (JP); Hiroji Morimoto, Nara (JP)

(73) Assignee: Panasonic Corporation, Osaka (JP)

( * ) Notice: Subject to any disclaimer, the term of this patent is extended or adjusted under 35 U.S.C. 154(b) by 508 days.

(21) Appl. No.: 12/672,875

(22) PCT Filed: Mar. 27, 2009

(86) PCT No.: PCT/JP2009/001385
§ 371 (c)(1),
(2), (4) Date: Feb. 9, 2010

(87) PCT Pub. No.: WO2010/035368
PCT Pub. Date: Apr. 1, 2010

(65) Prior Publication Data
US 2011/0210680 A1     Sep. 1, 2011

(30) Foreign Application Priority Data
Sep. 29, 2008   (JP) ................. 2008-250504

(51) Int. Cl.
G05F 1/00       (2006.01)
H05B 37/02      (2006.01)
H05B 39/04      (2006.01)
H05B 41/36      (2006.01)
H05B 39/02      (2006.01)
H05B 41/16      (2006.01)
H05B 41/24      (2006.01)
H05B 37/00      (2006.01)
H05B 39/00      (2006.01)
H05B 41/00      (2006.01)
H01J 11/04      (2011.01)
H01J 13/48      (2006.01)
H01J 15/04      (2006.01)
H01J 17/36      (2006.01)

(52) U.S. Cl. .............. 315/291; 315/209 R; 315/246; 315/326

(58) Field of Classification Search .................. None
See application file for complete search history.

(56) References Cited

U.S. PATENT DOCUMENTS
6,545,430 B2    4/2003 Ono et al.
(Continued)

FOREIGN PATENT DOCUMENTS
JP    2001-312997    11/2001
(Continued)

Primary Examiner — Douglas W Owens
Assistant Examiner — Dedei K Hammond

(57) ABSTRACT

The frequency of the alternating current to be supplied to the high-pressure discharge lamp is switched among a first frequency, a second frequency greater than the first frequency, and a third frequency smaller than or equal to the first frequency. In the switching, a period A, in which the alternating current of the third frequency is supplied, occurs at the beginning of each of the predetermined time intervals. A remainder of each of the predetermined time intervals includes a period B, in which the alternating current of the first frequency is supplied, and a period C, in which the alternating current of the second frequency is supplied, the periods B and C being alternately repeated, so as to control the period A to be longer than the period B and to have a length corresponding to a predetermined number of cycles, ranging from 5.5 to 50 cycles inclusive.

17 Claims, 18 Drawing Sheets

U.S. PATENT DOCUMENTS

| | | | |
|---|---|---|---|
| 7,023,144 B2 | 4/2006 | Suzuki et al. |
| 2006/0022613 A1 | 2/2006 | Suzuki et al. |

FOREIGN PATENT DOCUMENTS

| | | |
|---|---|---|
| JP | 2006-059790 | 3/2006 |
| JP | 2006/156414 | 6/2006 |
| JP | 2006-332015 | 12/2006 |
| JP | 2007-087637 | 4/2007 |
| JP | 2007-280734 | 10/2007 |
| JP | 2007280734 | * 10/2007 |
| JP | 2008-159470 | 7/2008 |

* cited by examiner

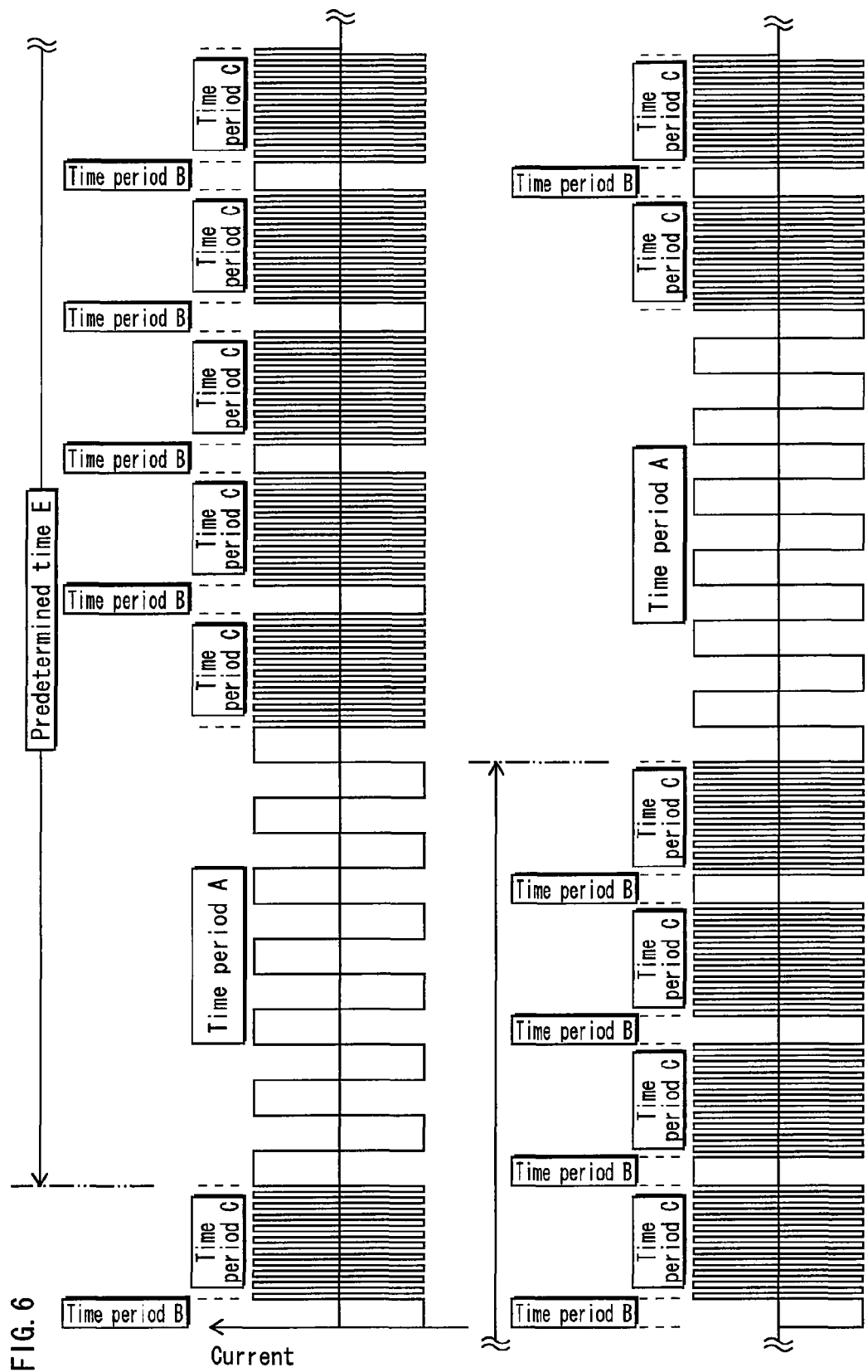

FIG. 8

| Test | Cycles in time period A | Lamp voltage [V] | | |
|---|---|---|---|---|
| | | At beginning of test | After 100 hours accumulated lighting time | After 2000 hours accumulated lighting time |
| Test-1 | 0.0 | 75 | 53 | 101 |
| Test-2 | 4.0 | 75 | 57 | 105 |
| Test-3 | 6.5 | 75 | 62 | 109 |
| Test-4 | 60.0 | 75 | 76 | 135 |

HIGH-PRESSURE DISCHARGE LAMP LIGHTING DEVICE, HIGH PRESSURE DISCHARGE LAMP APPARATUS USING THIS, PROJECTOR USING THE HIGH-PRESSURE DISCHARGE LAMP APPARATUS, AND HIGH-PRESSURE DISCHARGE LAMP LIGHTING METHOD

RELATED APPLICATIONS

The present application claims priority from PCT/JP2009/001385 filed on Mar. 27, 2009 which claims priority from Japanese Application No. 2008-250504 filed on Sep. 29, 2008.

TECHNICAL FIELD

The present invention relates to a high-pressure discharge lamp lighting device, a high-pressure discharge lamp apparatus using this, a projector using the high-pressure discharge lamp apparatus, and a high-pressure discharge lamp lighting method.

BACKGROUND ART

In recent years, projectors along with personal computers are widely used for presentations in conference rooms and so on. They are also used as home theater projectors for home theaters in ordinary households.

Such projectors are designed to use light emitted from a light source to provide an enlarged projection of an optical image, the image processed in accordance with image information. As their light source, a high-pressure discharge lamp, in particular a high-pressure mercury lamp, which is closer to a point light source and has a high luminance and a high color rendering property, is widely in use.

The high-pressure mercury lamp has an arc tube inside which a light-emitting material, mercury of more than 200 mg/cm$^3$, for example, is enclosed and a pair of tungsten electrodes is disposed substantially opposite to each other. Inside the arc tube, a halogen material, besides mercury, is also enclosed in order to use the so-called halogen cycle function to prevent tungsten, which is a constituent material of the electrodes, from diffusing and causing blackening by adhering to the inner wall of the arc tube during lighting.

It is known that, while the halogen cycle makes it possible to prevent the blackening of the inner wall of the arc tube, tungsten diffused from the electrodes again returns and adheres thereto, forming protuberances as it accumulates. Since the protuberances form bright spots of arcs between electrodes, when they are formed appropriately at tips of each electrode, stable arcs can be obtained so as to avoid occurrence of flicker due to so-called motions of arc bright spots.

In order to form and maintain such protuberances appropriately at the tips of each electrode, a high-pressure discharge lamp apparatus has been proposed, that includes a control unit for detecting shortening and lengthening of an electrode gap distance as the shapes of the protuberances change, and switching the frequency of an alternating current to be supplied to the high-pressure mercury lamp between a first value of less than 50 Hz or of 750 Hz and above, and a second value in a range from 50 to 700 Hz inclusive (Patent Document 1, for example). The high-pressure discharge lamp apparatus of Patent Document 1 is configured to promote growth of the protuberances by means of the alternating current of the second frequency when they reduce in size and the electrode gap distance increases, while promote evaporation by means of the alternating current of the first frequency when they grow and the distance decreases.

In contrast to the high-pressure discharge lamp apparatus of Patent Document 1, which is thus configured to recover the shapes of the protuberances after the shape changes took place, another high-pressure discharge lamp apparatus is also proposed, which is designed to modulate the frequency of an alternating current to be supplied to the high-pressure discharge lamp among two or more different values periodically (Patent Document 2, for example). The high-pressure discharge lamp apparatus of Patent Document 2 enables the protuberances to grow by means of an alternating current of at least one value and enables it to evaporate by means of an alternating current of the other values, and maintains the shapes of said protuberances by causing the growth and evaporation of the protuberances to repeat alternately.

PATENT DOCUMENT

Patent Document 1: Japanese patent application publication No. 2001-312997
Patent Document 2: Japanese Patent No. 3851343

DISCLOSURE OF INVENTION

Technical Problem

However, it turned out that, according to reviews of the present inventor and so on, in said conventional art high-pressure discharge lamp apparatus, some protuberances formed at tips of a pair of electrodes grew excessively, resulting in excessive decrease in a distance between said electrodes. For example, in a high-pressure discharge lamp apparatus of Patent Document 1, in the intervening period after growth and the shape changes of the protuberances took place, before they start to evaporate as a result of switching of an alternating current frequency for evaporating the protuberances, some protuberances grew excessively. The high-pressure discharge lamp apparatus of Patent Document 2 also has the following drawback: characteristics variations of high-pressure discharge lamps due to individual differences sometimes hindered a few high-pressure discharge lamps from maintaining appropriate protuberance shapes, leading to excessive growth of protuberances. There is a problem in such cases where protuberances grow excessively and a distance between a pair of electrodes overly decreases, that a lamp voltage decreases so excessively that a rated power cannot be supplied to a high-pressure discharge lamp, which leads to deterioration in illumination intensity. There is also a problem that temperature drop inside an arc tube causes malfunctioning of the halogen cycle, which leads to blackening of the arc tube.

In view of above, the present invention aims to provide a high-pressure discharge lamp lighting device, a high-pressure discharge lamp apparatus using this, a projector using the high-pressure discharge lamp apparatus, and a high-pressure discharge lamp lighting method, all of which are capable of suppressing an excessive decrease in lamp voltage, by forming and maintaining protuberances appropriately at tips of a pair of electrodes in a high-pressure discharge lamp.

Technical Solution

In order to solve the above drawbacks, one aspect of the present invention is a high-pressure discharge lamp lighting device that supplies an alternating current to a high-pressure discharge lamp to cause lighting, the high-pressure discharge lamp having an arc tube in which a halogen material is enclosed and a pair of electrodes is disposed opposite to each other, each electrode having a protuberance at a tip thereof, comprising: a frequency switch unit operable to switch a frequency of the alternating current to be supplied to the high-pressure discharge lamp among (i) a first frequency, (ii) a second frequency greater than the first frequency, and (iii) a third frequency smaller than or equal to the first frequency; and a control unit operable to control the frequency switch unit so that (a) a time period A, in which the alternating current of the third frequency is supplied, occurs at beginning of each of predetermined time intervals, and (b) a remainder of each of the predetermined time intervals includes (i) a time period B, in which the alternating current of the first frequency is supplied, and (ii) a time period C, in which the alternating current of the second frequency is supplied, the time period B and the time period C being alternately repeated, wherein the time period A is longer than the time period B, and has a length corresponding to a predetermined number of cycles of the alternating current of the third frequency, ranging from 5.5 to 50 cycles inclusive.

Another aspect of the present invention is a high-pressure discharge lamp apparatus, comprising: a high-pressure discharge lamp having an arc tube in which a halogen material is enclosed and a pair of electrodes is disposed opposite to each other, each electrode having a protuberance at a tip thereof; and the high-pressure discharge lamp lighting device operable to cause the high-pressure discharge lamp to light.

Yet another aspect of the present invention is a projector comprising the high-pressure discharge lamp apparatus.

Further, yet another aspect of the present invention is a high-pressure discharge lamp lighting method for supplying an alternating current to a high-pressure discharge lamp to cause lighting, the high-pressure discharge lamp having an arc tube in which a halogen material is enclosed and a pair of electrodes is disposed opposite to each other, and each electrode having a protuberance at a tip thereof, wherein while a frequency of the alternating current is switched among (i) a first frequency, (ii) a second frequency greater than the first frequency, and (iii) a third frequency smaller than or equal to the first frequency, (a) the frequency is switched to the third frequency at predetermined time intervals, to cause a time period A, in which the alternating current of the third frequency is supplied, to occur at beginning of each of the predetermined time intervals, (b) a remainder of each of the predetermined time intervals includes (i) a time period B, in which the alternating current of the first frequency is supplied, and (ii) a time period C, in which the alternating current of the second frequency is supplied, the time period B and the time period C being alternately repeated, and (c) the time period A is longer than the time period B, and has a length corresponding to a predetermined number of cycles of the alternating current of the third frequency, ranging from 5.5 to 50 cycles inclusive.

Advantageous Effects

The high-pressure discharge lamp lighting device constituted as mentioned above includes (i) a frequency switch unit operable to switch frequencies among a first frequency, a second frequency higher than the first frequency, and a third frequency less than or equal to the first frequency, and (ii) a control unit operable to control the frequency switch unit. Since alternating currents of each of the first to third frequencies have different values from one another, each has a function of causing protuberances formed on tips of a pair of electrodes to grow or disappear. By repeating alternately a time period B, in which the alternating current of the first frequency is supplied, and a time period C, in which the alternating current of the second frequency is supplied, the present invention makes it possible to obtain the mixed effect of growth and disappearance effects, enabling an appropriate formation and maintenance of the protuberances. Further, by repeating a time period A, which is longer than the time period B and has a length corresponding to a predetermined number of cycles of the alternating current of the third frequency ranging from 5.5 to 50 cycles inclusive, at beginning of each of predetermined time intervals, the present invention makes it possible to prevent excessive growth and poor contraction of the protuberance in an effective manner, thereby form and maintain the protuberance appropriately.

The "appropriate formation and maintenance of the protuberances" herein does not merely mean to form the protuberances in a specific concrete shape and maintain the specific shape. On the contrary, the shape of protuberances is not particularly limited, and it needs only to be able to suppress excessive decrease in distance between a pair of electrodes and occurrence of arc jump to a satisfactory extent.

The high-pressure discharge lamp lighting method having the above constitution also achieves the effects similar to the above high-pressure discharge lamp lighting device.

According to the present invention, it is possible to provide a high-pressure discharge lamp lighting device, a high-pressure discharge lamp apparatus using this, a projector using the high-pressure discharge lamp apparatus, and a high-pressure discharge lamp lighting method, all of which are capable of forming and maintaining protuberances appropriately at tips of a pair of electrodes in a high-pressure discharge lamp to suppress excessive drop in lamp voltage.

BRIEF DESCRIPTION OF DRAWINGS

FIG. 6 shows an example of an alternating current waveform of the high-pressure mercury lamp according to the first embodiment in a steady-state lighting condition.

FIG. 8 is a table showing voltage transition results in a lighting test.

Figure 1:
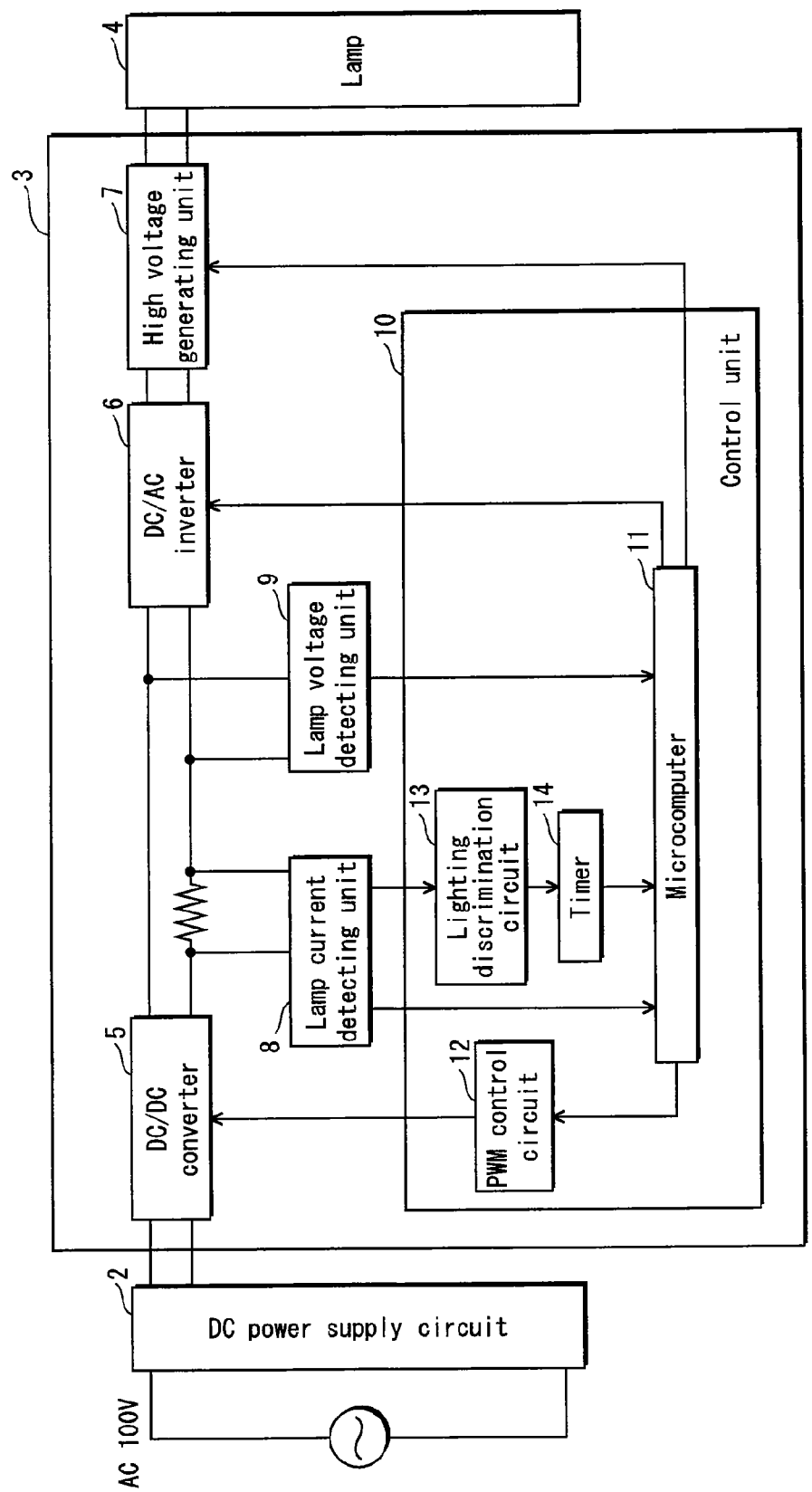
FIG. 1 is a block diagram showing a structure of a high-pressure mercury lamp according to a first embodiment.

EXPLANATION OF REFERENCE 1. high-pressure discharge lamp apparatus
2. DC power supply circuit
3. high-pressure discharge lamp lighting device
4. high-pressure mercury lamp
5. DC/DC converter
6. DC/AC inverter
7. high voltage generating unit
8. lamp current detecting unit
9. lamp voltage detecting unit
10. control unit
11. microcomputer
12. PWM control circuit
13. lighting discrimination circuit
14. timer
16. light-emitting section
18. discharge space
19. electrode
20. electrode bar
21. electrode coil
22. tip
23. protuberance
26. reflective mirror
27. lamp unit
28. reflective surface
35. front projector
42. rear projector
50. color wheel
50a. borderline
51. color wheel
55. front projector
56. optical unit
57, 58. lens
59. DMD panel
65. mirror group
66. liquid crystal panel
70. prism
E: predetermined time (predetermined time interval)
L: electrode gap distance

BEST MODE FOR CARRYING OUT THE INVENTION

Detailed description of preferred embodiments of the present invention will be described below, with reference to figures.

First Embodiment

<Structure>

FIG. 1 is a block diagram showing a structure of a high-pressure discharge lamp apparatus according to a first embodiment.

As shown in FIG. 1, the high-pressure discharge lamp apparatus 1 comprises a DC power supply circuit 2 connected to an outside alternating current (AC 100V) power supply, the circuit 2 operable to connect, via a high-pressure discharge lamp lighting device 3 (electronic ballast), to a high-pressure discharge lamp, such as a high-pressure mercury lamp 4.

The DC power supply circuit 2 includes, for example, a rectifying circuit (not shown), and generates a constant direct current from domestic use AC voltage (100 V) to supply to the high-pressure discharge lamp lighting device 3.

The high-pressure discharge lamp lighting device 3 is mainly composed of a DC/DC converter 5, DC/AC inverter 6, a high voltage generating unit 7, a lamp current detecting unit 8, a lamp voltage detecting unit 9, and a control unit 10.

Upon receiving a PWM (Pulse Width Modulation) control signal from the control unit 10, the DC/DC converter 5 supplies a direct current of a predetermined magnitude to the DC/AC inverter 6. This is due to that constant power control for keeping lamp voltage constant is necessary, in order to maintain a constant optical output of a high-pressure mercury lamp 4 during a stable lighting (i.e. in a steady-lighting condition). For this, in the control unit 10, a microcomputer 11 computes a lamp power, based on a lamp current detected in the lamp current detecting unit 8, as well as a lamp voltage detected in the lamp voltage detecting unit 9. A PWM control circuit 12 then sends a PWM control signal to the DC/DC converter 5, such that the computed lamp power is kept constant. Upon receiving the PWM control signal, the DC/DC converter 5 converts a direct current voltage from the DC power supply circuit 2 to a direct current of a predetermined magnitude. Nevertheless, when a lamp voltage is low (i.e. when a lamp current is high) in a period after activation operation and before actual start-up of a lamp, the control unit 10 sends a PWM control signal to the DC/DC converter 5 for the purpose of constant current control.

The "steady-lighting condition" herein means a state in which a constant current is being supplied to a high-pressure discharge lamp, and so a gas pressure inside the lamp is stabilized to a corresponding degree. Also, "constant current control" after activation operation does not merely mean a control for keeping a current value constant, but rather control as a whole, including a restriction on the current in order to prevent an excessive current flow into a lamp in a low lamp voltage condition before actual start-up of the lamp. Accordingly, it includes a case in which a current value is inconstant. Yet, constant current control herein does not comprise constant power control, although constant power control that is performed after a lamp is started up may sometimes be understood as a kind of constant current control.

The DC/AC inverter 6 generates a substantially square-wave alternating current that is to be supplied to the high-pressure mercury lamp 4, while functioning as a frequency switch unit for switching an alternating current frequency to a predetermined value. Specifically, the DC/AC inverter 6 converts a direct current, which was output from the DC/DC converter 5, to a substantially square-wave alternating current of a specific frequency, the frequency being determined based on a control signal from the control unit 10.

The "substantially square-wave" alternating current herein not only includes a perfect square-wave current, but also a square-wave with a slight distortion due to overshoot, undershoot, and the like right after a polarity reversal. As a lighting method for suppressing arc jump, it is conventionally known to use alternating wave forms in which (i) a pulse current is superimposed in every square-wave half cycle before the polarity reversal, (ii) inclination is given to every square-wave half cycle so that a current value increases with lapse of time, and (iii) one cycle of high frequency wave is added right before or after the polarity reversal in every square-wave half cycle and a lamp current supplied only in latter half cycle of the added wave is set to be higher than the lamp current supplied before the one cycle was added. The "substantially square-wave" herein also includes an altered wave, that is, a standard square-wave with some components superimposed.

The high voltage generating unit 7 includes, for example, a transformer (not shown), urges dielectric breakdown between electrodes 19 of the high-pressure mercury lamp 4, and generates a high voltage and supplies the generated voltage to the high-pressure mercury lamp 4, thereby causing activation of the high-pressure mercury lamp 4.

The lamp current detecting unit 8 detects a current (which corresponds to a lamp current) flowing in a line between the DC/DC converter 5 and the DC/AC inverter 6, and outputs a signal for indicating the level of the lamp current.

The lamp voltage detecting unit 9 detects an output voltage (which corresponds to a lamp voltage) of the DC/DC converter 5, and outputs a signal for indicating the level of the lamp voltage.

The control unit 10 includes a microcomputer 11, a PWM control circuit 12, a lighting discrimination circuit 13, and a timer 14. The microcomputer 11 receives the output signals from the lamp current detecting unit 8, the lamp voltage detecting unit 9, and the timer 14, and subsequently controls the DC/DC converter 5 and the DC/AC inverter 6. Among these, a signal for controlling the DC/AC inverter 6 includes a frequency control signal which controls the frequency of an alternating current when generating the alternating current. In other words, the control unit 10 sends control signals to the DC/AC inverter 6 to cause the alternating currents of various frequencies to be generated, in accordance with the frequency control signals. Accordingly, the frequency of the alternating current can be varied in a desired manner by altering the setting of a program in the microcomputer 11 as needed.

The PWM control circuit 12 receives a PWM control signal from the microcomputer 11, and then makes a PWM control over the DC/DC converter 5. The lighting discrimination circuit 13 detects lighting of the lamp. The timer 14 starts counting when the lighting of the lamp is detected. Operations of the control unit 10 will be described later in details.

Now, description will be made on a general structure of the high-pressure mercury lamp 4 with a 180 W power rating, with reference to FIG. 2.

Figure 2:
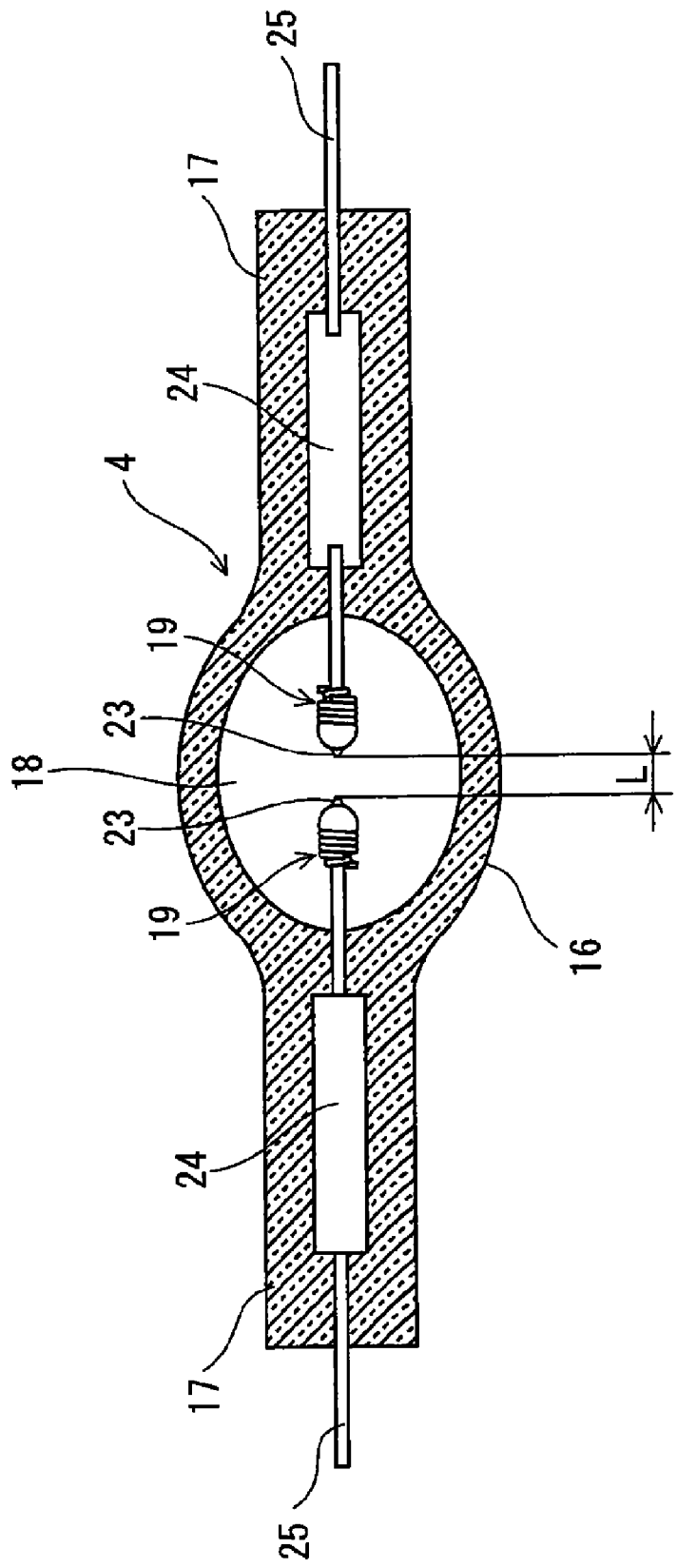
FIG. 2 is a partially cutaway section view of an arc tube of the high-pressure mercury lamp according to the first embodiment.

As shown in FIG. 2, an arc tube of the high-pressure mercury lamp 4 has an external casing manufactured from quartz glass, for example. The arc tube also includes a light-emitting section 16 of a substantially spheroidal shape at a center of the tube, and seal sections 17 of a substantially cylindrical shape that respectively extend outwards from either side of the light-emitting section 16 in conjunction therewith.

Inside the light-emitting section 16 (a discharge space 18), mercury (Hg) that is a light-emitting material, a noble gas for aiding activation, such as Argon (Ar), Krypton (Kr), Xenon (Xe), or a mixture gas of two or more of these, and a halogen material, such as Iodine (I), Bromine (Br), or these mixture, are enclosed, each having a predetermined amount. For example, the amount of enclosed mercury is set to be in a range from 150 mg/cm$^3$ to 390 mg/cm$^3$ inclusive, enclosed Argon (at 25° C.) is set to be in a range from 0.01 Mpa to 1 Mpa inclusive, and enclosed Bromide is set to be in a range from $1 \times 10^{-10}$ mol/cm$^3$ to $1 \times 10^{-4}$ mol/cm$^3$ inclusive, preferably $1 \times 10^{-9}$ mol/cm$^3$ to $1 \times 10^{-5}$ mol/cm$^3$ inclusive.

Further, inside the light-emitting section 16, a pair of tungsten (W) electrodes 19 are disposed in such a manner that the respective tips of the pair of electrodes substantially opposite to each other. As an example, the gap between the tips of the electrodes 19, which is the electrode gap distance L, is set in a range from 0.5 mm to 2.0 mm inclusive.

Figure 3:
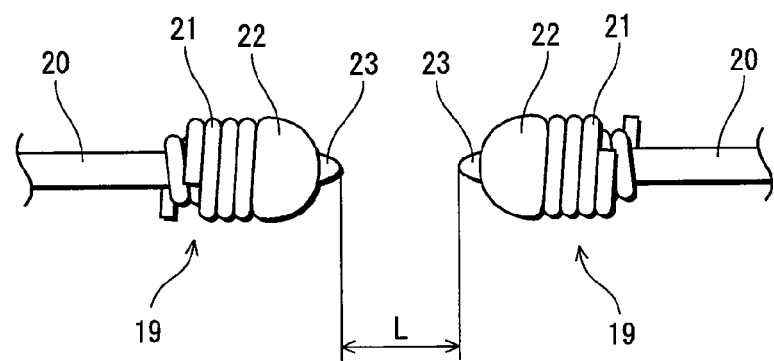
FIG. 3 shows a structure of electrodes of the high-pressure mercury lamp according to the first embodiment.

As shown in FIG. 3, the electrodes 19 include electrode bars 20 and electrode coils 21 attached to the end portions thereof. In particular, the tips 22 (end portions) of the electrodes 19 are processed substantially in the shape of a semi-sphere, a sphere, or a circular cone, for example, by melting integrally a part of the electrode bars 20 and a part of the electrode coils 21.

At the tips 22 of the electrodes 19, due to the halogen cycle effect during lighting, after tungsten that composes the electrodes 19 evaporates, the tungsten returns in particular to the very tips 22 of the electrodes 19, where the tungsten accumulates to self-form protuberances 23 without any mechanical processing. Note that the protuberances 23 herein are already formed to a certain extent at the completion of manufacture, since the protuberances are formed during lighting in a manufacturing process. The electrode gap distance L therefore means, in particular, the gap between the protuberances 23.

In addition, the method for forming the tips of the electrodes 19 substantially in the shape of a semi-sphere, a sphere, or a circular cone and the like, is not limited to the above method of melting a part of the electrode bars 20 and the electrode coils 21 respectively. For example, it may also be envisaged to attach sections, which are preliminarily shaped and cut away substantially in the shape of a semi-sphere, a sphere, or a circular cone, or are preliminarily sintered in such shape, to the tips of the electrode bars 20.

With reference to FIG. 2 again, the end of each electrode 19 other than the end portion forming the tip 22 of the electrode 19 is connected to the end portion of an external lead 25 via pieces of molybdenum foil 24. The end of the external lead 25 other than the end portion connected with the end of each electrode 19 extends from the end surface of the seal section 17, and is connected to a power-supply line or a base that are not shown.

Figure 4:
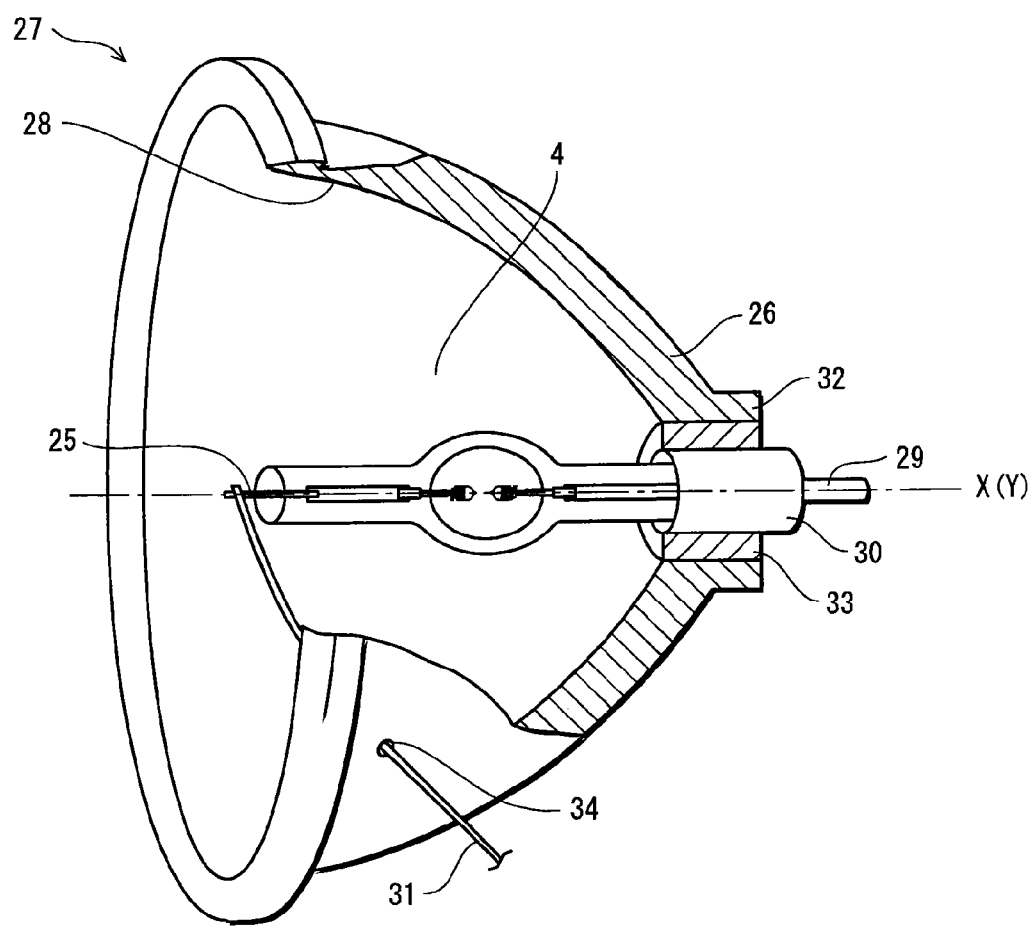
FIG. 4 is a partially cutaway perspective view of a structure of a lamp unit according to the first embodiment.

The high-pressure mercury lamp 4 is fitted into a reflective mirror 26 to constitute a lamp unit 27, as shown in FIG. 4.

More specifically, the lamp unit 27 includes, as shown in FIG. 4, said high-pressure mercury lamp 4 and the reflective mirror 26 having a glass or metal substrate provided with a reflective surface, an inner surface of which is concave. The high-pressure mercury lamp 4 is fitted within the reflective mirror 26, in such a manner that a longitudinal central axis X of the lamp and an optical axis Y of the mirror 26 are substantially aligned so as to improve a concentration ratio of light, and light emitted from the high-pressure mercury lamp 4 is reflected by the reflective surface 28.

The high-pressure mercury lamp 4 includes a base 30 of a cylindrical shape, which is provided with a power supply connection terminal 29 in the seal section 17. One end portion of the external lead 25 protruding from one of the seal section 17 is connected to the power supply connection terminal 29, and the other end portion of the external lead 25 is connected with the power supply line 31.

The base 30 of the high-pressure mercury lamp 4 is inserted in a neck 32 of the reflective mirror 26, and fixed thereto by means of an adhesive 33. On the other hand, the power supply line 31 is passed through a through-hole 34 pierced through the reflective mirror 26.

In addition, the reflective surface 28 is formed by, for example, a spheroidal surface or a paraboloid of revolution, which is coated with multilayer interference films of evaporated substances.

<Operations>

Figure 5:
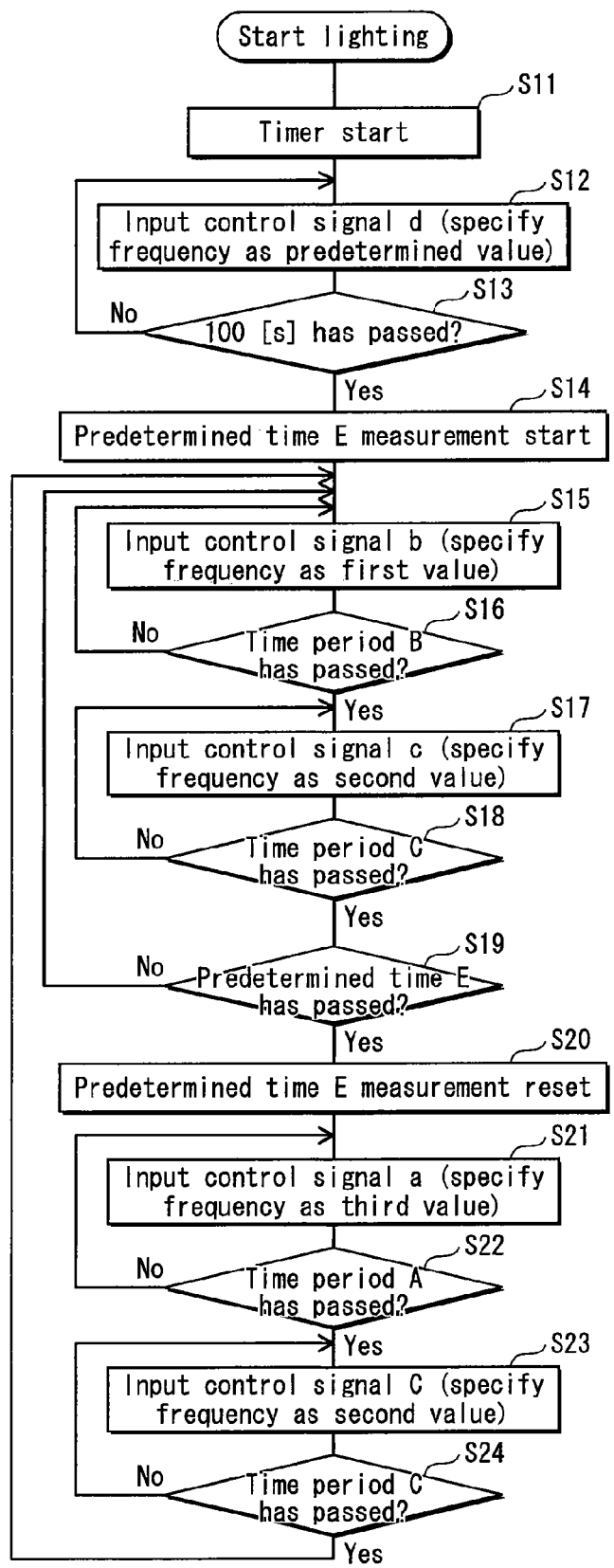
FIG. 5 is a flowchart showing operations of the high-pressure discharge lamp lighting device according to the first embodiment.

Now description will be made on an example of operations of the high-pressure discharge lamp lighting device 3 according to the present embodiment, with reference to FIG. 1, FIG. 2, and the flowchart of FIG. 5. FIG. 5 is a flowchart showing modulation control of an alternating current in the high-pressure discharge lamp lighting device 3. Note that the activation operation which will be described below is omitted in the flowchart of FIG. 5.

(1) Firstly, when a lighting switch for causing the high-pressure mercury lamp 4 to start discharging (which is not shown) is switched on, the control unit 10 causes the high-pressure generating unit 7 to generate a high voltage of a high frequency, for example, a voltage of 3 kV of a frequency 100 kHz. The generated high voltage of a high frequency is applied to the high-pressure mercury lamp 4.

(2) When dielectric breakdown occurs between the electrodes 19 of the high-pressure mercury lamp 4, an arc discharge current of a high frequency begins to flow between them. In other words, the high-pressure mercury lamp 4 begins to discharge. After the beginning of discharge, the high voltage of the high frequency is continued to be applied to the high-pressure mercury lamp 4 for a certain period of time.

Subsequently, constant current control is performed, for example, for two seconds, to maintain a current of the high frequency selected in a range from 10 to 500 kHz inclusive, as a warm-up period of the electrodes 19 to stabilize discharge. When the warm-up period of two seconds passes over, a so-called activation operation is completed.

In addition, in the above activation operation, an output from the high-pressure generating unit 7 for causing the high-pressure mercury lamp 4 to start discharging is not limited to the high voltage of the high pressure. Instead, it is also possible to use a well-known intermittent oscillation high voltage pulse. Also, the method for stabilizing the arc discharge current after beginning of discharge is not limited to the method using the high frequency, but instead it may be constant current control to maintain a well-known direct current or a current of a low frequency of less than 20 Hz.

(3) Following the activation operation, constant current control (to give a 3 A current constantly, for example) by means of a substantially square-wave alternating current is performed.

(4) The control unit 10 keeps lighting the high-pressure mercury lamp 4, while controlling the constant current, until a lamp voltage increases and reaches a predetermined voltage value (60 V, for example) as mercury evaporates. Meanwhile, the control unit 10 also judges whether lighting has started, in accordance with an output signal from the lamp current detecting unit 8. If lighting has started, the control unit 10 causes the timer 14 to start counting (S 11) and inputs a control signal d to DC/AC inverter 6 (S 12), as shown in FIG. 5. The control signal d is a signal for specifying a frequency of an alternating current which is to be supplied to the high-pressure mercury lamp 4 as a predetermined value (for example, 135 Hz). In accordance with the control signal d, the DC/AC inverter 6 specifies the frequency, and performs the polarity reversal of the alternating current.

(5) Set-up time of the timer 14 is selected in a range from 60 to 300 seconds inclusive, and in this embodiment, 100 seconds was selected. The control unit 10 keeps inputting the control signal d to the DC/AC inverter 6 until 100 seconds have passed since the beginning of lighting (S 13: NO). When 100 seconds have passed since lighting started, the high-pressure mercury lamp 4 is in a steady-state lighting condition, and the control unit 10 executes modulation control of the substantially square-wave alternating current (S 13: YES).

(6) When 100 seconds have passed since lighting started, the control unit 10 starts to measure a predetermined time (predetermined time interval)E (S 14).

(7) Next, the control unit 10 inputs a control signal b to the DC/AC inverter 6 (S 15). The control signal b is a signal for specifying the frequency of the alternating current in the time period B as a first frequency (referred to as a first value below). This causes the DC/AC inverter 6 to output the alternating current of the first value, as specified by the control signal b, to be supplied to the high-pressure mercury lamp 4.

(8) The control unit 10 keeps inputting the control signal b to the DC/AC inverter 6 until it reaches the time period B (S 16: NO), and when it reaches the time period B (S 16: YES), the control unit 10 switches the control signal b to a control signal c (S 17). The control signal c is a signal for specifying the frequency of the alternating current in the time period C as a second frequency (referred to as a second value below). This causes the DC/AC inverter 6 to output the alternating current of the second value, as specified by the control signal c, to be supplied to the high-pressure mercury lamp 4.

(9) The control unit 10 keeps inputting the control signal c to the DC/AC inverter until it reaches the time period C (S 18: NO), and when it reaches the time period C (S 18: YES), the control unit 10 checks that E period has passed (S 19).

(10) In this stage, if E period has not passed (S 19: NO), the control unit 10 switches the control signal c to the control signal b (S 15), goes back to (7) mentioned above, and repeats the operations that follow S 15.

(11) If period E has passed (S 19: YES), the control unit 10 resets the measurement of period E (S 20), and switches the control signal c to a control signal a (S 21). The control signal a is a signal for specifying the frequency of the alternating current in the time period A as a third frequency (referred to as a third value below). This causes the DC/AC inverter 6 to output the alternating current of the third value, as specified by the control signal a, to be supplied to the high-pressure mercury lamp 4.

(12) The control unit 10 keeps inputting the control signal a to the DC/AC inverter 6 until it reaches the time period A (S 22: NO), and when it reaches the time period A (S 22: YES), the control unit 10 switches the control signal a to a control signal c (S 23). This causes the DC/AC inverter 6 to output the alternating current of the second value, as specified by the control signal c, to be supplied to the high-pressure mercury lamp 4.

(13) The control unit 10 keeps inputting the control signal a to the DC/AC inverter 6 until it reaches the time period C (S 24: NO). When it reaches the time period C (S 24: YES), the control unit 10 goes back to (7) mentioned above, switches the control signal c to a control signal b (S 15), and repeats the operations that follow S 15.

(14) From then on, the control unit 10 repeats a series of steps S 15 to S 24 until the lighting switch is turned off.

According to the above operations, the following control can be realized: (a) the time period A, in which the alternating current of the third value is supplied, occurs at beginning of each of predetermined time intervals E; (b) a remainder of each of the predetermined time intervals includes (i) a time period B, in which the alternating current of the first value is supplied, and (ii) a time period C, in which the alternating current of the second value is supplied, the time period B and the time period C being alternately repeated. More specifically, in each of the predetermined time E, (i) the time period A is followed by the time period C, (ii) subsequently the time period B and the time period C are alternately repeated, and (iii) the time period C then terminates the predetermined time interval.

The above first to third values, the time periods A to C, and the predetermined time E are set up in the following way.

The first value is selected in a range from 20 to 200 Hz inclusive, and the time period B is set to have a length corresponding to a certain number of cycles of the alternating current of the first value, the number of the cycles selected in a range from 0.5 to 10 cycles inclusive.

The second value is selected in a range from 300 to 1000 Hz inclusive, and the time period C is set to have a length corresponding to a certain number of cycles of the alternating current of the second value, the number of the cycles selected in a range from 2 cycles to 200 cycles inclusive.

The third value is smaller than or equal to the first value, and selected in a range from 15 to 150 Hz inclusive. In this case, it is preferable to set the third value smaller than or equal to the first value. The length of the time period A is longer than the time period B, and set to have a length corresponding to a certain number of the cycles of the alternating current of the third value selected in a range from 5.5 to 50 cycles inclusive. The time period A is set to occur at beginning of each of the predetermined time intervals E. Finally, the predetermined time E means the time elapsed from the starting point of one time period A to the starting point of a subsequent time period A, and selected variously in a range from 1 to 300 seconds inclusive.

It is also preferable to set the above first to third values, the time periods A to C, and the predetermined time E in accordance with features of the high-pressure mercury lamp 4, such as its rated lamp power, lamp current, and lamp voltage.

Reasons for why the those first to third values, the time periods A to C, and the predetermined time E are set in the above-mentioned range will be described later.

<Example of Alternating Current Waveform>

FIG. 6 shows an example of the waveform of a substantially square-wave alternating current obtained from the above operations in a steady-state lighting condition.

In a waveform alternating current shown in FIG. 6, the first to third values, the time periods A to C, and the predetermined time E are set as follows.

The first value is 65 Hz, and the time period B has a length corresponding to 0.5 cycle of the alternating current of the first value.

The second value is 340 Hz, and the time period C has a length corresponding to 10 cycles of the alternating current of the second value.

The third value is 55 Hz, and the time period A has a length corresponding to 6.5 cycles of the alternating current of the third value. The predetermined time E is set 30 seconds, and the time period A occurs at beginning of each of the predetermined time E intervals.

As can be seen in FIG. 6., between one time period A (in the upper column of FIG. 6) and a subsequent time period A (in the lower column of FIG. 6), the time periods B and the time periods C are alternately repeated more than once, and the time periods C occur respectively before and after each time period A. In addition, a portion of the time interval between one time period A and the other time period A is omitted.

Further, the alternating current in each time period B is controlled to have an opposite phase alternately in the order of occurrence of the time period B. More specifically, the length of the time period B corresponds to an odd number of 0.5 cycles, and the length of the time period C corresponds to an even number of 0.5 cycles. Accordingly, when the time period B, the time period C, and the time period B occur in the stated order, the alternating current in the last period B has an opposite phase to the alternating current of the first time period B. Since the alternating current in the time period C is coupled with the phase of the alternating current in the time period B, the time periods C similarly have an opposite phase alternately in the order of the occurrence of the time periods C.

The alternating current in each of the time periods A is also controlled to have an opposite phase alternately in the order of occurrence of the time periods A. More specifically, the length of each time period A corresponds to, similarly to the time period B, an odd number of 0.5 cycles, and in this embodiment, the time periods B are set to be repeated for an even number of times in the predetermined time E. Due to these, the alternating current of one time period A has an opposite phase to a subsequent time period A.

Thus, by controlling each alternating current that is supplied in the time period A and the time period B, which each has the length corresponding to an odd number of 0.5 cycles, so that each alternating current in each of the time periods has an opposite phase alternately, the present invention makes it possible to keep balance of how often each electrode 19 serves as a positive electrode and a negative electrode respectively. As a result, it becomes possible to make a balance between growth and contraction in a protuberance 23 in each electrode 19, therefore to form and maintain the protuberance 23 appropriately.

Figure 7B:
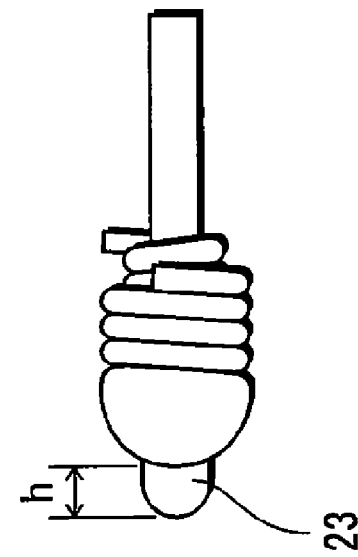
FIG. 7 is a view showing a pattern diagram for explaining protuberance shapes at tips of electrodes.
Figure 7A:
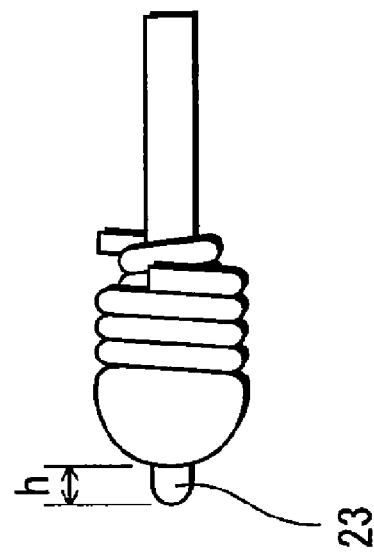

In the high-pressure discharge lamp apparatus 1 constituted as above, growth of the protuberance 23 of each electrode 19 can be accelerated, by supplying the alternating current of the first value to the high-pressure mercury lamp 4. In particular, the protuberance 23 is caused to grow in such a manner that its diameter enlarges (refer to FIG. 7 (*a*)). In this case, as the protuberance 23 grows, to become enlarged, its height h becomes longer, and electrode gap distance L becomes shorter. Note that each shape of the protuberance 23 is exaggerated in FIGS. 7 (*a*) and 7 (*b*) in order to make it easier to understand the growth and contraction of the protuberance 23.

On the other hand, contraction of the protuberance 23 of each electrode 19 can be realized, by supplying the alternating current of the second value to the high-pressure mercury lamp 4. In particular, the protuberance 23 is caused to contract in such a manner that its diameter diminishes (refer to FIG. 7 (*b*)). In this case, as the protuberance 23 grows to become contracted, its height h becomes shorter, and electrode gap distance L becomes longer. Accordingly, by repeating the time periods B and the time periods C alternately, a mixture effect of both growth and contraction, and therefore appropriate formation and maintenance of the protuberance 23 can be achieved.

Further, a temporal temperature rise at the tip of the electrode 19 can also be realized, by supplying the alternating current of the third value to the high-pressure mercury lamp 4. As a result, the present invention makes it possible to prevent excessive growth and poor contraction of the protuberance 23 in an effective manner, thereby form and maintain the protuberance 23 appropriately.

<Test Result>

FIG. 8 is a table showing voltage transition results in a lighting test, and the test results were obtained from the high-pressure discharge lamp apparatus 1 according to the present embodiment, and other three lamp devices which all have a different length of the time period A from the high-pressure discharge lamp apparatus 1. In this description, the constituent elements common in every lamp device used for the test are referenced by the same numerals in order to make it easier to understand.

The high-pressure mercury lamp 4 of each lamp device has a 180 W rated power and a 3 A rated current. The frequency of the alternating current which is to be supplied to the high-pressure mercury lamp 4 is controlled to be switched among (i) the first value of 65 Hz, and the time period B of a length corresponding to 0.5 cycle, (ii) the second value of 340 Hz, and the time period C of a length corresponding to 10 cycles, and (i) the third value of 55 Hz, and the time period A of a length corresponding to a predetermined number of cycles, while the predetermined time E is set 30 seconds. This is to say that, apart from the length of the time period A, the structure of the above frequency is same as the example of the alternating current waveform as shown in FIG. 6.

Test-1 shows a voltage transition result in which the time period A has a length corresponding to 0.0 cycle, and the frequency of the alternating current is switched only between the first and second values. Test-2 shows the result in which the time period A has a length corresponding to 4.0 cycles, which is selected in a range from 0.5 cycle inclusive to 5.5 cycles exclusive. Test-3 shows the result in which the time period A has length corresponding to 6.5 cycles, which is longer than the above time period B and is selected in a range from 5.5 to 50 cycles inclusive; Test-3 shows the result in which the alternating current of the FIG. 6 waveform is supplied. Test-4 shows the result in which the time period A has a length corresponding to 60 cycles, which is selected from a range more than 50 cycles. A lamp voltage at the beginning of the test is 75 V in all of the Tests-1 to 4.

It is said that the protuberance 23 is likely to grow excessively in an early stage of an accumulated lighting time (for example, within 100 hours), since the function of halogen cycle becomes activated in the early stage. Accordingly, in the test results shown in FIG. 8, the lamp voltages measured after of the order of 100 hours accumulated lighting time are subjected for comparison.

As shown in FIG. 8, after of the order of 100 hours accumulated lighting time the lamp voltage in Test-1 is 53 V and the lamp voltage in Test-2 is 57 V. Compared to 75 V obtained at the beginning of the tests, it can be seen that the lamp voltages in those tests have excessively dropped. In such cases where the lamp voltage excessively drop to less than 60 V, a rated power may not be supplied to the high-pressure mercury lamp 4. This leads to deterioration of illumination intensity, as well as a drop in temperature inside the arc tube of the high-pressure mercury lamp 4, thereby causing malfunction of the halogen cycle and blackening of the arc tube.

On the other hand, the lamp voltage in Test-3 measures 62 V after of the order of 100 hours accumulated lighting time, which shows that, although it is smaller compared to the lamp voltage at the beginning of the test, the voltage drop is suppressed compared to Tests-1 and 2. The lamp voltage in Test-4 measures 76 V after of the order of 100 hours accumulated lighting time, which is slightly bigger than the beginning of the test. Further, it can be seen that in Test-4 the lamp voltage has overly risen to as much as 135 V after of the order of 2000 hours accumulated lighting time. The excessive rise in the lamp voltage is due to excessive evaporation and contraction of the protuberance 23, and excessive lengthening of the electrode gap distance L, as a result of the length of the time period A set to more than 50 cycles. The lengthening of the electrode gap distance L brings about an increase in arc length, thereby causing condensing efficiency of the reflective mirror 26, therefore illumination intensity of the high-pressure mercury lamp 4 to drop.

In addition, it is proven that, in Test-2 even when the length of the time period A is selected to have the number of cycles other than 4.0 cycles in a range from 0.5 cycle inclusive to 6 cycles exclusive, the lamp voltage drops to 60 V or below, just like the result shown in FIG. 8. It is also proven that, in Test-4, even when the number of cycles other than 60 cycles in a range more than 50 cycles is selected, the lamp voltage excessively rises as the accumulated lighting time approaches to of the order of 2000 hours.

In this way, high-pressure discharge lamp lighting device 3 according to the present embodiment makes it possible to cause the temperature at the tip 22 of the electrode 19 to temporarily rise, so as to prevent excessive growth and poor contraction of the protuberance 23 in an effective manner, by setting the length of the time period A to be longer than the above time period B and to have a predetermined number of cycles selected in a range from 5.5 to 50 cycles inclusive.

<Setting Range of Each Value, Each Time Period, and Predetermined Time E>

Now, description will be made on the setting range of the first to the third values, the time periods A to C, and the predetermined time E.

In the alternating current to be supplied to the high-pressure mercury lamp 4, if the first value becomes smaller than 20 Hz, speed of the polarity reversal drops and it takes longer time for the electrode 19 to be switched between the anode and the cathode, causing excessive anodic heating of the tip 22 of the electrode 19. This leads to a temperature overrise at the tip 22, obstruction of growth, and possibly deformation or contraction of the protuberance 23. On the other hand, if the first value becomes greater than 200 Hz, it takes less time for the electrode 19 to be switched between the anode and the cathode and the temperature at the tip 22 of the electrode 19 cannot rise fully, thereby leading to obstruction of growth, and possibly deformation or contraction due to evaporation of the protuberance 23. Also, even if the first value is in a range from 20 to 200 Hz inclusive, (i) setting the time period B greater than 10 cycles may lead to a temperature overrise at the tip 22, and possible deformation or contraction due to evaporation of the protuberance 23, and (ii) setting the time period B less than 0.5 cycle may lead to an insufficient temperature rise at the tip 22 of the electrode 19, thereby causing deformation or contraction of the protuberance 23. For the above reasons, the first value is set in a range from 20 to 200 Hz inclusive, and the time period B is set to have a length corresponding to a predetermined number of cycles of the frequency ranging from 0.5 to 10 cycles inclusive, so as to accelerate the growth of the protuberance 23.

If the second value is greater than 1000 Hz, evaporated and ionized tungsten significantly loses its returning force to the protuberance 23 of the electrode 19, which accelerates diminishment of diameters of the protuberance 23. Consequently, tungsten ions accumulate on some parts other than the tips 22 of the electrodes 19, and the general shape of the tips 22 may be caused to deform and contract. On the other hand, if the second value is smaller than 300 Hz, the diameter of the protuberance of the electrode 19 may not be fully diminished. Consequently, the protuberance 23 grows excessively, and the electrode gap distance L may decrease excessively. The second value herein means either of the followings: (i) one value, or (ii) an average value (referred to as an average frequency below) of more than one values selected in a range from 210 to 1000 Hz inclusive. When the average frequency is used for the second value, the more than one values are successively switched in a particular order every half-wave cycle during the time period C. In addition, the "average frequency" herein means a value which is obtained by summing up every value in every half-wave cycle in the whole time period C, and dividing the sum total by the number of half-wave cycles in the time period C.

Among the plurality of frequencies, if a frequency less than 210 Hz is used in the 0.5 cycle, since the cycle appears intermittently, repetition of even as short as 0.5 cycle of the frequency eventually brings about the growth effect of the protuberance 23, the effect being the same as that brought about by the first value. Accordingly, the diameter of the protuberance 23 may not be fully diminished. Also, even if the second value is in a range from 300 to 1000 Hz inclusive: (i) setting the length of the time period C greater than 200 cycles leads to further diminishment of the diameter of the protuberance 23, and contraction of the tip 22, and (ii) setting the time period C less than 2 cycles hinders the diameter of the protuberance 23 from being diminished, thereby possibly brings about the excessive growth of the protuberance 23. For the above reasons, the second value is set in a range from 300 to 1000 Hz inclusive, and the time period C is set to have a length corresponding to a predetermined number of cycles ranging from 2 to 200 cycles inclusive, so as to diminish the diameter of the protuberance 23, causing contraction.

If the third value is less than 15 Hz, temperature at the tip 22 of the electrode 19 overrises instantaneously, and not only the protuberance 23 but the general shape of the electrode 19 may be deformed or contracted due to evaporation. On the other hand, if the third value is greater than 150 Hz, temperature at the tip 22 of the electrode 19 may not be risen instantaneously, and possibly the protuberance 23 may not be evaporated and contracted enough. For the above reasons, the third value is set in a range from 15 to 150 Hz inclusive, so as to evaporate and contract the protuberance 23.

Regarding the predetermined time E at beginning of which the time period A occurs, if the time E is less than 1 second, instantaneous temperature rise at the tip 22 of the electrode 19 occurs too frequently, and not only the protuberance 23 but the whole tip 22 of the electrode 19 may be deformed or contracted due to evaporation. On the other hand, if the time E is greater than 300 seconds, instantaneous temperature rise at the tip 22 of the electrode 19 does not often occur, and possibly evaporation and contraction effect of the protuberance 23 may not be fully achieved. For the above reasons, the predetermined time E is set in a range from 1 to 300 seconds inclusive.

In the above settings, the first to third values, time periods A to C, and the predetermined time E may be adjusted separately, or in connection with one another. With the settings appropriate to features of the lamp, the present invention makes it possible to form and maintain the protuberance 23 appropriately.

The lengths of the time periods A to C correspond to the multiples of 0.5 cycle respectively, and they cannot be set 0.3 or 0.7, for example.

In the present embodiment, the predetermined time E substantially means a duration from the beginning of one time period A to the beginning of another time period A. Therefore, in a very first period E from the measurement start (S 14) of the time E to the beginning of a first time period A (S 21), the time period B and the time period C are repeated all the more often because the time period A has no presence there. However, this makes a minor influence, and the repeated time period B and time period C do not cause the protuberance 23 to grow excessively. Of course it is also possible to set the duration from the measurement start (S 14) of the time E to the beginning of a first time period A (S 21) in a manner different from the present embodiment. For example, the duration can be shorter for the length of time period A compared to the predetermined time E.

<Projector>

Now, description will be made on a projector using the high-pressure discharge lamp apparatus 1.

Figure 9:
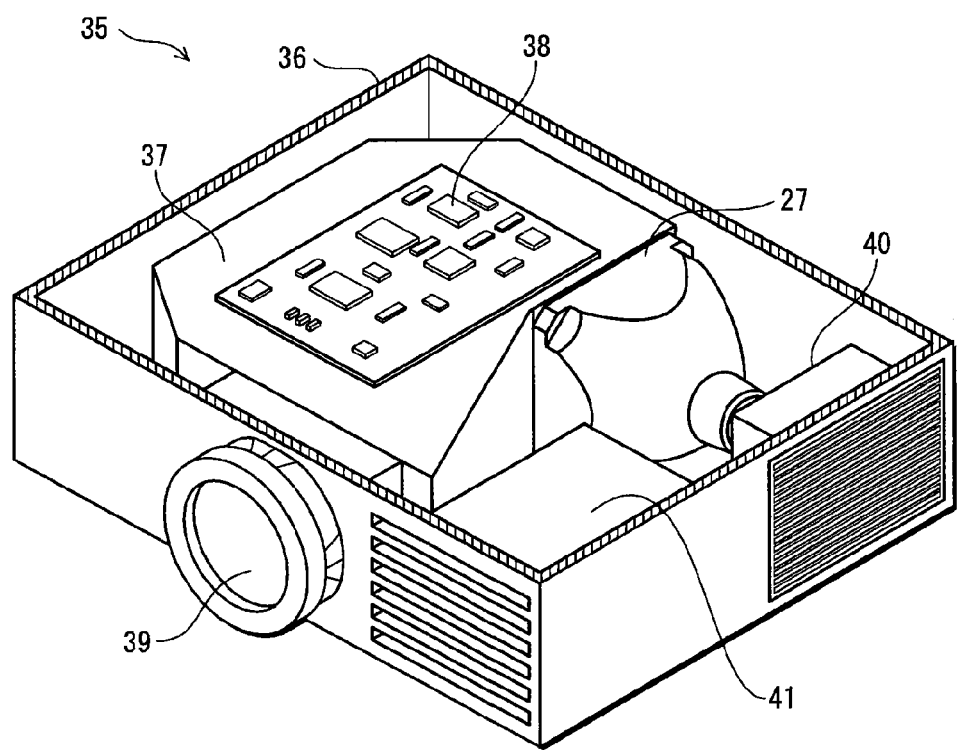
FIG. 9 is a partially cutaway perspective view of a front projector for a projector according to the first embodiment.

FIG. 9 shows a schematic structure of a front projector 35, as an example of a projector in which the high-pressure discharge lamp apparatus 1 is used. The front projector 35 is a front type projector that projects an image towards a screen (not shown) set in front thereof. The front projector 35 has three transparent liquid crystal panels as its image display device, which will be described later.

The front projector 35 comprises a light source lamp unit 27, an optical unit 37, a control unit 38, a projection lens 39, a cooling fan unit 40, and a power supply unit 41 and others, all of which are housed in an outer casing 36. The power unit 41 includes the DC power supply circuit 2 and the high-pressure discharge lamp lighting device 3 mentioned above, and converts a power from a commercial power supply to a power type suitable for the control unit 38, the lamp unit 27, and the cooling fan unit 40 and supply it to each of them. In addition, in FIG. 9 a top panel of the outer case 36 is omitted in order to make it easier to see the structure of the front projector 35.

Figure 10:
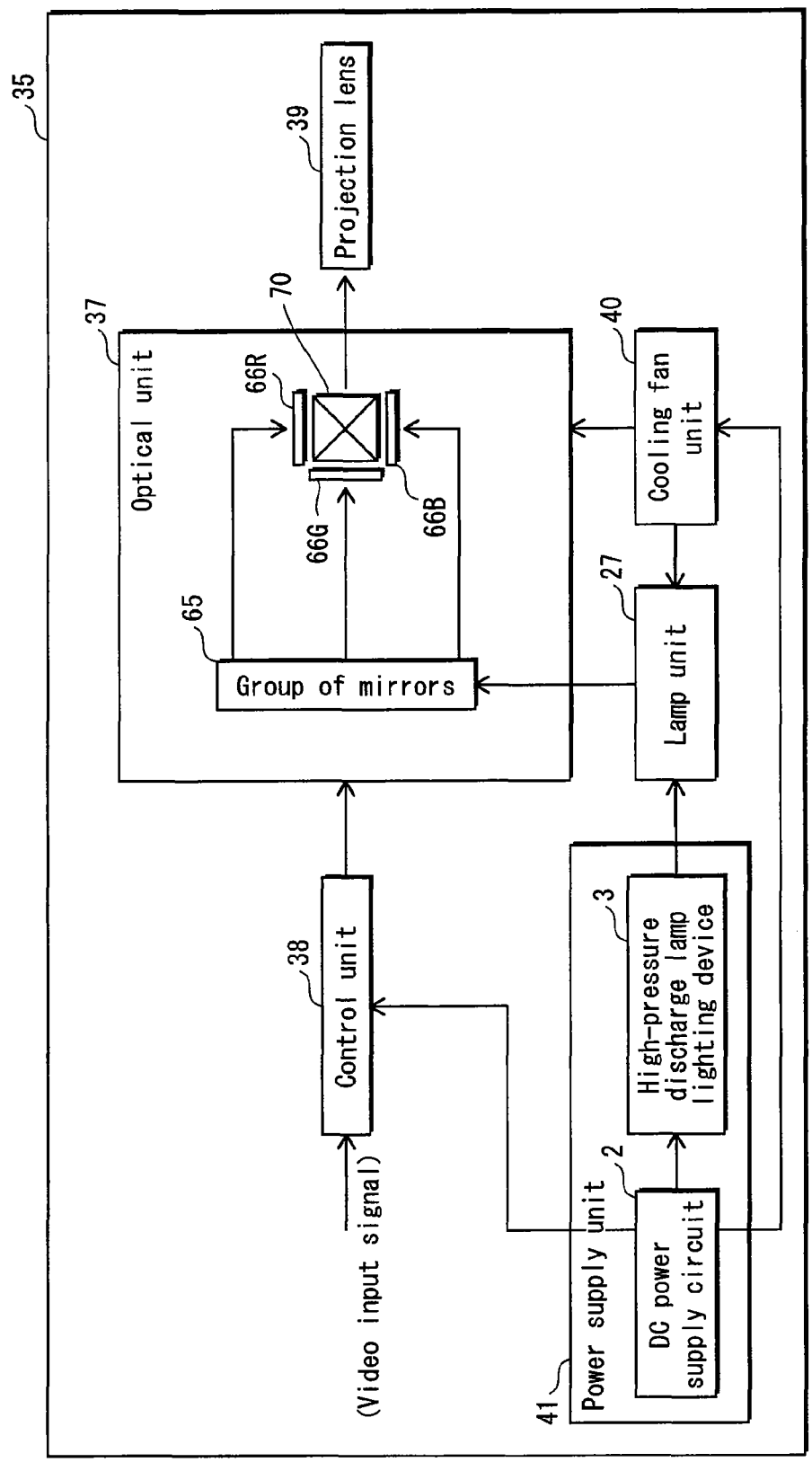
FIG. 10 is a block diagram showing a structure of the front projector in FIG. 9.

FIG. 10 shows a concrete example of the structure of the front projector 35 in which three transparent liquid crystal panels are used as a image display device.

As shown in FIG. 10, the optical unit 37 includes a group of mirrors 65 (including a dichroic mirror), three transparent liquid crystal panels 66 R, 66 G, 66 B, which correspond to three primary light colors of R, G, and B, and a prism 70. When light projected from the lamp unit 27 is split by the group of mirrors 65 into three colors of R, B, and then passes through each of the liquid crystal panels 66 R, 66 G, 66 B. The liquid crystal panels 66 R, 66 G, 66 B are driven by the control unit 38 to display images according to respective image signals corresponding to each of the colors of R, G, and B. The above partial images in R, and B are then combined by the prism 70 and displayed on the screen (not shown) via the projection lens 39.

Although the projector in which three transparent liquid crystal panels are used as a image display device was illustrated on the above, the present invention is not limited to this. On the contrary, the present invention may similarly be applied to a projection device using the image display devices of three Lcos (Liquid Crystal on Silicon)type reflective liquid crystal panels, or the DLP (DLP: registered trademark of US Texas Instruments Co., Ltd.) system using three DMDs (Digital Micromirror Devices).

Second Embodiment

There are the following two image display systems of the projector: (i) as mentioned above, images in three primary colors are combined simultaneously by means of the three image display devices which respectively correspond to R, G, and B, and (ii) images in respective three primary colors are projected by means of only one image display device in a temporal sequence.

Now, description will be made on how the present invention is applied to a front projector of the DLP type using a piece of DMD (referred to below as a single panel DLP system) as an image display device.

<Structure>

Figure 11:
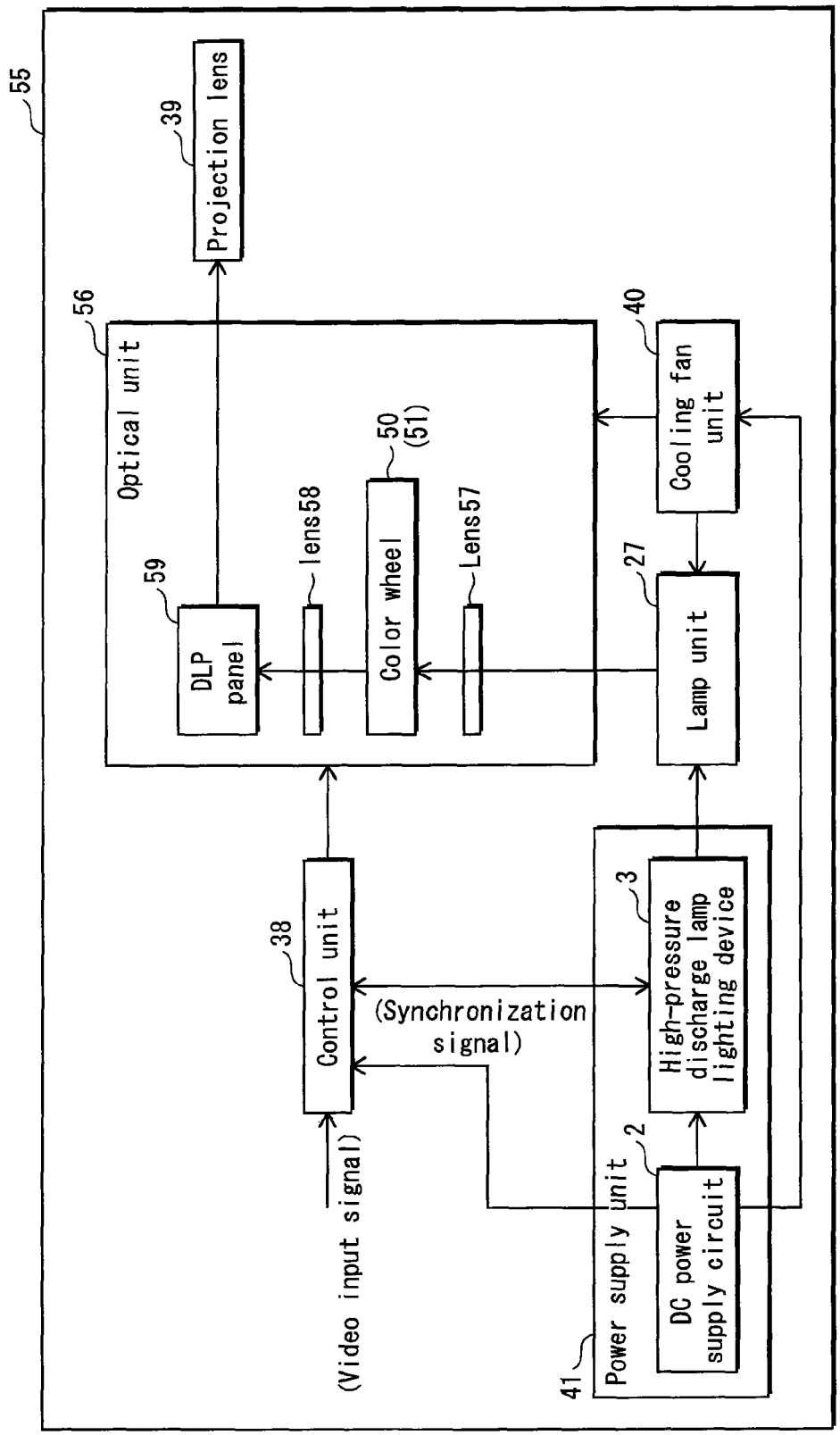
FIG. 11 is a block diagram showing a front projector according to a second embodiment.

FIG. 11 shows a concrete example of a structure of the front projector of the single panel DLP system.

The front projector 55 of the single panel DLP system differs from the projector 35 according to the above first embodiment with the optical unit 37 including three transparent liquid crystal panels 66 R, 66 G, 66 B, in a point that it is provided with an optical unit including a single DMD panel.

Note that the constituent elements common with the projector 35 in FIG. 10 are referenced by the same numerals in order to make it easier to understand.

Figure 12A:
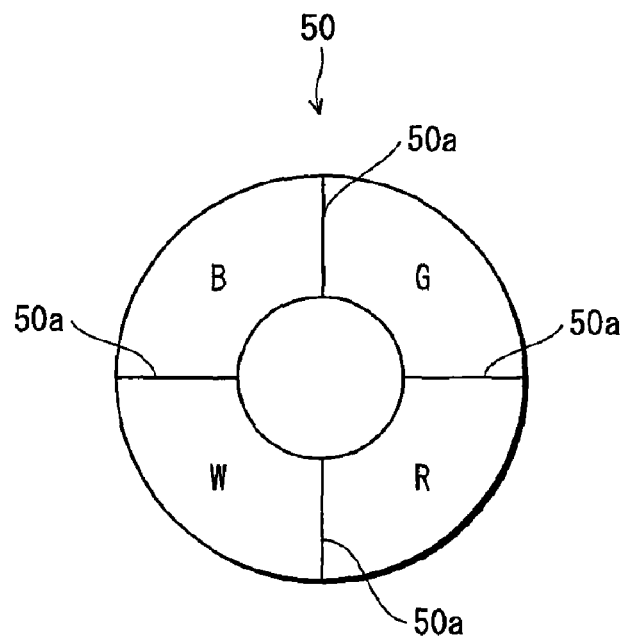
FIG. 12 is a view showing a pattern diagram of color wheels, in which each segment in a color wheel (a) has an equal central angle, and each segment in a color wheel (b) has an unequal central angle.
Figure 12B:
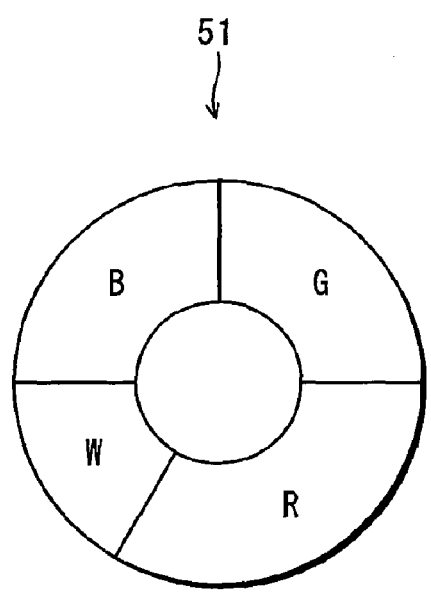

The optical unit 56 of the projector 55 includes two lenses 57, 58 disposed along a light path, a color wheel 50 disposed between the two lenses 57, 58, and a single DMD panel 59 or an image display device disposed in such a manner that the DMD panel 59 faces the color wheel 50 in a light pass across the lens 58. On the color wheel 50 as shown in FIG. 12 (a), four segments in total, a white W filter in addition to three filters of R, and B, are arranged around a circle, with each segment having an equal angle. The color wheel rotates rapidly at the rotation rate of the integral multiple of the frequency of a video input signal (refer to FIG. 11). In addition, the video input signal in the present embodiment has a frequency of 60 Hz.

<Operation>

The front projector 55 is able to let the light from the lamp unit 27 pass through the rapidly rotating color wheel via the lens 57 and subsequently project four lights of R, G, B, and W, on a DMD panel 59 by time division. The DMD panel 59 is controlled by the control unit 38 to change reflective angles of built-in micro mirrors, in response to the respective image signals corresponding to the respective colors. Subsequently, the reflected image lights in R, G, B, and W are displayed on the screen (not shown) via the projection lens 39. The images in each color are switched in a temporal sequence so rapidly that they are perceived as a desirable projection image with combination of the colors by the human eye.

In such a single panel DLP type front projector 55, when it has an alternating current lighting type lamp as a light source, it is general that the timing of the polarity reversal of the alternating current supplied to the lamp unit 27 is synchronized with the rotation round of the color wheel 50, from the standpoint of image quality. More specifically, polarity reversal of the light projected from the lamp can be adjusted to occur everytime the light routes through one border 50 a (refer to FIG. 12 (a)) or a plurality of borders 50 a. This aims to minimize the influence caused by a drop in the light projected from the lamp at the timing of the polarity reversal of the alternating current. For, the drop in the projected light is brought about by the fact that, at the timing of the polarity reversal operation, the current value once drops to zero and rises in a reverse polarity, which requires a certain amount of time. Accordingly, in actual operations, the polarity reversal of the alternating current is adjusted to occur only after the following steps are completed: (i) detecting that the high-pressure mercury lamp 4 is activated and that the arc discharge is stabilized by electrical characteristics of the lamp or time elapsed from the activation start, (ii) turning the lamp lighting device 3 to a synchronization signal waiting state, and (iii) causing the lamp lighting device 3 to respond to the synchronization signal from the control unit 38 and perform the polarity reversal of the current. Thus, the polarity reversal of the alternating current and the rotation round of the color wheel are synchronized.

<Examples of Alternating Current Waveform>

<Example 1 of Alternating Current Waveform>

Figure 13:
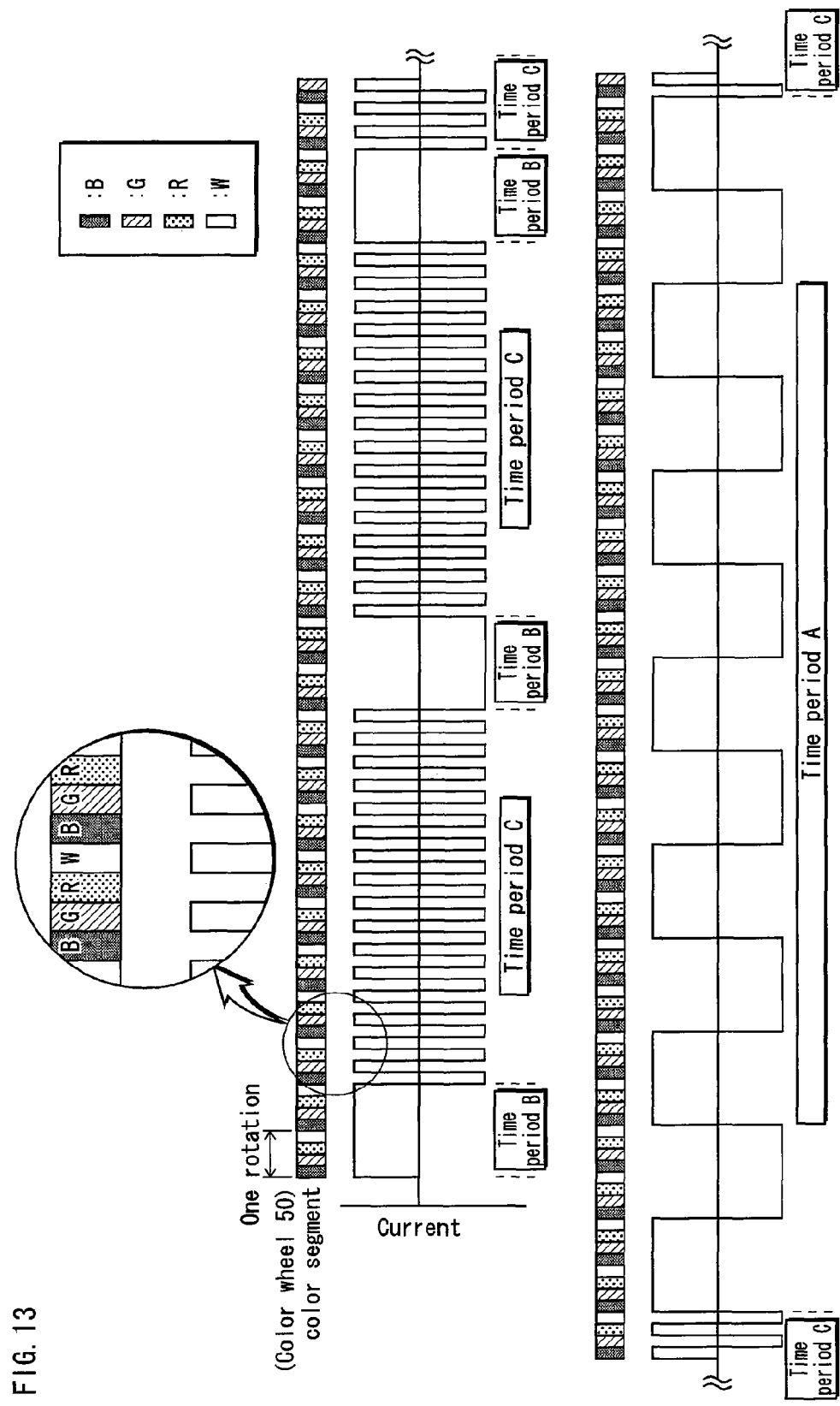
FIG. 13 shows an example of an alternating current waveform of the front projector according to the second embodiment.

FIG. 13 shows an example of an alternating current waveform in the front projector according to the present invention, using the color wheel 50 in which each color segment is arranged to have an equal central angle. Each segment of B, G, R, and W in the color wheel 50 has a central angle of 90 degree respectively (refer to FIG. 12 (a)). The color wheel 50 rotates at the rotation speed of 10800 rpm, which corresponds to 180 Hz, the three times the frequency of the video input signal. As a light source, the high-pressure mercury lamp 4 of a 180 W rated power is used, which is same as the first embodiment. The first to third values, the time periods A to C, and the predetermined time E are set up as follows.

The first value is 45 Hz, the time period B has a length corresponding to 0.5 cycle of the alternating current of the first value, and the color wheel rotates twice during the time period B.

The second value is 360 Hz, the time period C has a length corresponding to 16 cycles of the alternating current of the second value, and the color wheel rotates 8 times during the time period C.

The third value is 45 Hz, the time period A has a length corresponding to 6.5 cycles of the alternating current of the third value, and the color wheel rotates 26 times during the time period A.

The predetermined time E, at beginning of which the time period A occurs, is set 30 seconds.

As is the same as the above first embodiment, the time periods B and the time periods C are alternately repeated more than once between one time period A and a subsequent time period A, and the time periods C occur respectively before and after each time period A. Further, in the predetermined time E, the alternating current in each of the time periods B is controlled to have an opposite phase alternately in the order of occurrence of the time periods B. The alternating current in each of the time periods A is also controlled to have an opposite phase alternately in the order of occurrence of the time periods A.

The above settings enables the protuberance 23 of each electrode 19 to maintain a balance between growth and contraction in the single panel DLP type front projector 55, as is similar to the above first embodiment, thereby leading to the appropriate formation and maintenance of the protuberance 23.

<Example 2 of Alternating Current Waveform>

As a structure for enhancing color reproducibility, one that uses the color wheel having four color segments, each color segment arranged to have an unequal central angle, is known. FIG. 12 (b) shows a color wheel 51 in which segment R has a large angle, while segment W has a small angle. In case the color wheel 51 of this kind is used, among the lights in respective colors obtained via the color wheel 51, the light in color R has the longest appearance time, and the light in color W has the shortest appearance time. In this way, by making the appearance time of the light in R the longest, availability of color R, which intrinsically has a low content level, may be increased in the light emitted from the lamp unit 27.

Figure 14:
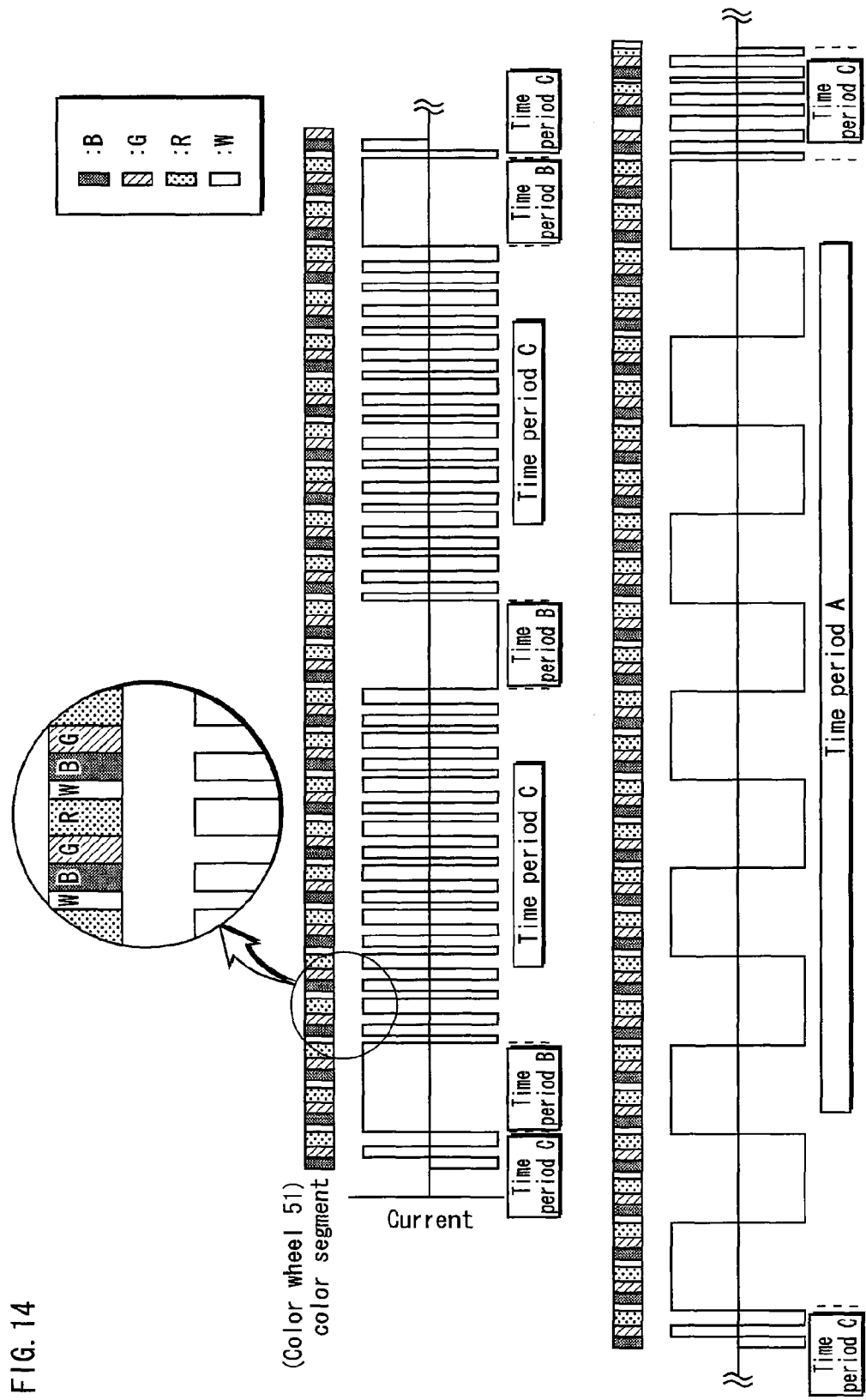
FIG. 14 shows another example of an alternating current waveform of the front projector according to the second embodiment.

FIG. 14 shows another example of an alternating current waveform in the front projector according to the present invention, using the color wheel 51 in which each color segment is arranged to have an unequal central angle. Each segment of B, G, R, and W in the color wheel 51 has the following angle: segment B of 85 degree, segment G of 95 degree, segment R of 120 degree, and segment W of 60 degree. The color wheel 51 rotates at the rotation speed of 10800 rpm, which corresponds to 180 Hz, three times the frequency of the video input signal. As a light source, the high-pressure mercury lamp 4 of a 180 W rated power is used, which is same as the first embodiment.

In the examples of the alternating current waveforms in FIG. 13 and FIG. 14, the settings of the first and third values, lengths of the time periods A to C, and the predetermined time E are the same, but the kind of the color wheel and the frequency of the current to be supplied in the time period C are different.

More specifically, in the FIG. 13 waveform example the current supplied to the time period C is fixed to one frequency of 360 Hz, whereas in the FIG. 14 waveform example, the alternating current in the time period C is constituted by a plurality of 0.5 cycles, each supplied with one of the four frequencies of 270 Hz, 341 Hz, 381 Hz, and 540 Hz. This is to say that the second value in the FIG. 14 waveform example means the average value obtained from the sum total of those four frequencies in each 0.5 cycle. More precisely, in the time period C in the FIG. 14 waveform example, one round consisting of 0.5 cycle of 381 Hz for B segment, 0.5 cycle of 341 Hz for G segment, 0.5 cycle of 270 Hz for segment R, and 0.5 cycle of 540 Hz for segment W, is periodically repeated. The average value in the time period C obtained from those four frequencies selected in a range from 210 to 1000 Hz inclusive is 383 Hz, which is the second value. In addition, the above one round corresponds to one rotation of the color wheel 51.

Since color R in the FIG. 14 waveform example has the longer appearance time than the FIG. 13 waveform example, the availability of R is increased and color reproducibility is enhanced.

As long as the average frequency in the time period C lies in a range from 300 to 1000 Hz inclusive, the effect of the present invention can be achieved.

<Example 3 of Alternating Current Waveform>

As a structure for further enhancing the color reproducibility of the projected image, a method in which the color wheel, with each color segment arranged to have an unequal central angle is used, as is same as the above, and also the amount of the light passing through each color segment is varied. For example, the light amount projected from the lamp unit 27 is controlled in such a way that the light amount passing through segment R is increased and the light amount passing through segment W is decreased. By this, the availability of color R is further increased, and color reproducibility is enhanced. The control over the amount of the light projected from the lamp unit 27 can be performed, by causing the microcomputer 11 inside the lamp lighting device 3 to increase or decrease the amount of the current flow.

Figure 15:
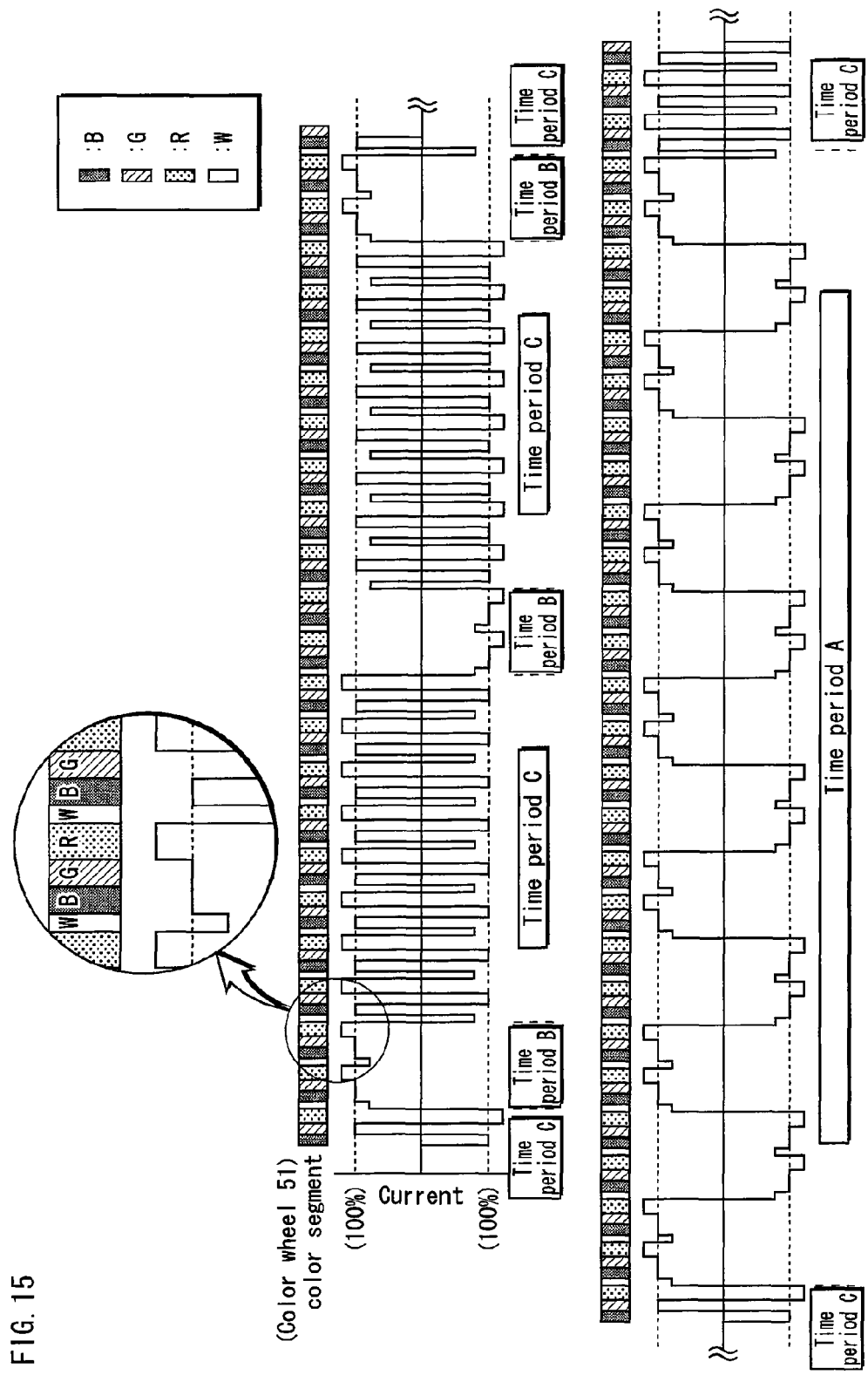
FIG. 15 shows yet another example of an alternating current waveform of the front projector according to the second embodiment.

FIG. 15 shows yet another example of an alternating current waveform of the front projector according to the present invention, using the color wheel with each segment having an unequal central angle, in combination with the above method for controlling the amount of projected light, or increasing and decreasing the current flow.

In the examples of the alternating current waveforms in FIG. 14 and FIG. 15, the settings of the first to third values, the lengths of the time periods A to C, the predetermined time E, and the color wheel are the same. However, in the FIG. 14 waveform example the current value remains constant in each segment, whereas in the FIG. 15 the current value is varied from segment to segment in order to change the amount of the light passing through each segment of the color wheel.

More specifically, given that the current value in the FIG. 14 is considered 100%, the current increase and decrease percentages in each segment in the FIG. 15 waveform example are as follows: ±0% in B and G segments (100% of the current), +10% in segment R (110% of the current), and −10% in segment W (90% of the current).

Further, in the case in which the method for increasing and decreasing the current flow is combined with the use of the color wheel, it is preferable to set the timing between the polarity reversal of the alternating current and the rotation round of the color wheel 51 in such a manner that, in the time periods A to C, the segment which the largest amount of the current is to pass through (i.e. segment R in this embodiment) matches the current right before the polarity reversal, as shown in FIG. 15. This allows to effectively dissolve instability of the arc of the high-pressure mercury lamp 4 which is likely to occur in the segment in which the current amount is decreased (i.e. segment W in this embodiment).

<Example 4 of Alternating Current Waveform>

In the FIG. 15 waveform example, the current increase in segment R takes place only in one side of the pair of the electrodes 19 in one time period C, and it takes place only in the other side of the pair of the electrodes 19 in a subsequent time period C. From a long term standpoint that the time period C occurs repeatedly for a number of times, the increased current is considered to be applied to both of the electrodes 19 alternately, thereby maintaining a balance between growth and contraction of the protuberance 23 of each electrode 19. However, if the time period C is set long, the increased current is supplied to one of the electrodes for a long period, thereby potentially resulting in an imbalance between growth and contraction in the protuberance 23 of the electrode.

Figure 16:
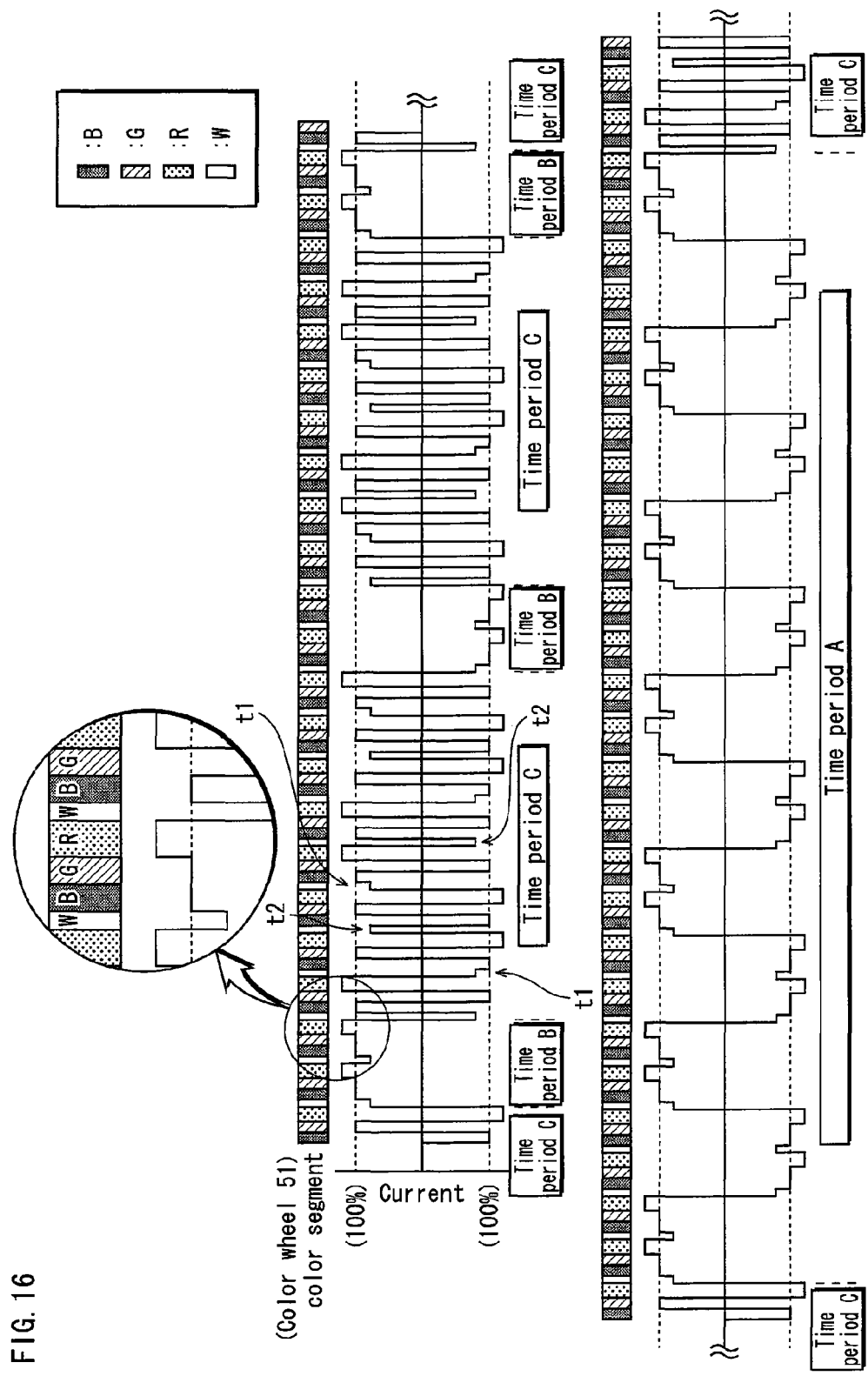
FIG. 16 shows yet another example of an alternating current waveform of the front projector according to the second embodiment.

FIG. 16 shows yet another example of an alternating current waveform for preventing the current increase from taking place only in one side of the electrodes.

In the FIG. 16 waveform example and the FIG. 15 waveform example, the settings of the polarity reversal, the frequency structure, and the average value of the frequencies (i.e. the second value) in the time period C are different. The first and third values, the time period A and the time period B, and the predetermined time E are set to be same in both of them.

First of all, difference in the setting of the polarity reversal will be looked at. In the FIG. 15 waveform example, the polarity of the alternating current in the time period C is adjusted to be reversed everytime each segment of the color wheel 51 switches. On the other hand, in the FIG. 16 waveform example, the polarity of the alternating current in the time period C is adjusted either to "be reverted" (t2 in FIG. 16) or "remain uninverted" (0 in FIG. 16) only when it is switched to flow from segment W to segment B of the color wheel 51. As for the remaining points, the FIG. 16 waveform example is set in the same way as the FIG. 15 waveform example. This allows to prevent the imbalance between growth and contraction in the protuberance 23 of the electrode, even when period C is set long.

Next, the frequency structure of the alternating current and the average value of the frequencies, or the second value, will be looked at. In the FIG. 16 waveform example, the alternating current in the time period C is constituted by a plurality of 0.5 cycles of five kinds of frequencies of 223 Hz, 270 Hz, 341 Hz, 381 Hz, 540 Hz, and it differs from the FIG. 15 in a point that 0.5 cycle of 223 Hz is included. More specifically, in the FIG. 16 waveform, a first round consisting of 0.5 cycle of 540 Hz, 0.5 cycle of 381 Hz, 0.5 cycle of 341 Hz, and 0.5 cycle of 270 Hz, and a second round consisting of 0.5 cycle of 223 Hz, 0.5 cycle of 341 Hz, and 0.5 cycle of 270 Hz are periodically repeated. In addition, the above each round corresponds to one rotation of the color wheel 51. The average value of the frequency in the time period C constituted by a plurality of 0.5 cycles of those five frequencies selected in a range from 210 to 1000 Hz inclusive is 338 Hz, which is the second value. As long as the average frequency in the time period C lies in a range from 300 to 1000 Hz inclusive, the effect of the present invention can be achieved.

In addition, although the present embodiment uses the color wheel 51 with each color segment arranged to have an unequal angle, in combination with the method for increasing and decreasing the current amount, color reproducibility can also be enhanced or improved to a desirable level, by combining the color wheel 50 with each color segment having an equal central angle, with the method for increasing and decreasing the current amount.

Also, the present embodiment shows the structure of the color wheel and the method for increase and decrease the current amount both of which are to increase the availability of color R in order to enhance color reproducibility, but it is not limited to color R. The present invention can also be applied to a case in which availability of any of the other colors is to be increased. Similarly, the present invention can also be applied to a case in which the structure of the color wheel and the method for increase and decrease the current amount are elaborated in order to enhance illumination intensity, as well as color reproducibility. Further, as for the segments of the color wheel, the present invention can similarly be applied to five or six color segments of an yellow Y filter or a cyan C filer besides the above four colors, or six color segments of the filter Y, the filter C, and a magenta M filters besides the three primary colors of R, and B filters.

<Concrete Examples of Synchronization Method>

Now, description will be made on the concrete examples of the synchronization method, the method in which the control unit 38 sends a synchronization signal, and, in response to the synchronization signal, the high-pressure discharge lamp lighting device 3 performs the polarity reversal of the alternating current. The synchronization method includes a first synchronization method in which a synchronization signal is caused to occur everytime the color wheel rotates, and a second synchronization method in which a synchronization signal is caused to occur everytime each color segment of the color wheel is switched. The projector used in the concrete examples below includes the color wheel 51 with each segment having an unequal central angle, in combination with the method for increase and decrease the current applied to the each segment. Again, the first to third values, the time periods A to C, and the predetermined time E are set to be same as the alternating current waveform example in FIG. 15.

<First Synchronization Method>

Figure 17:
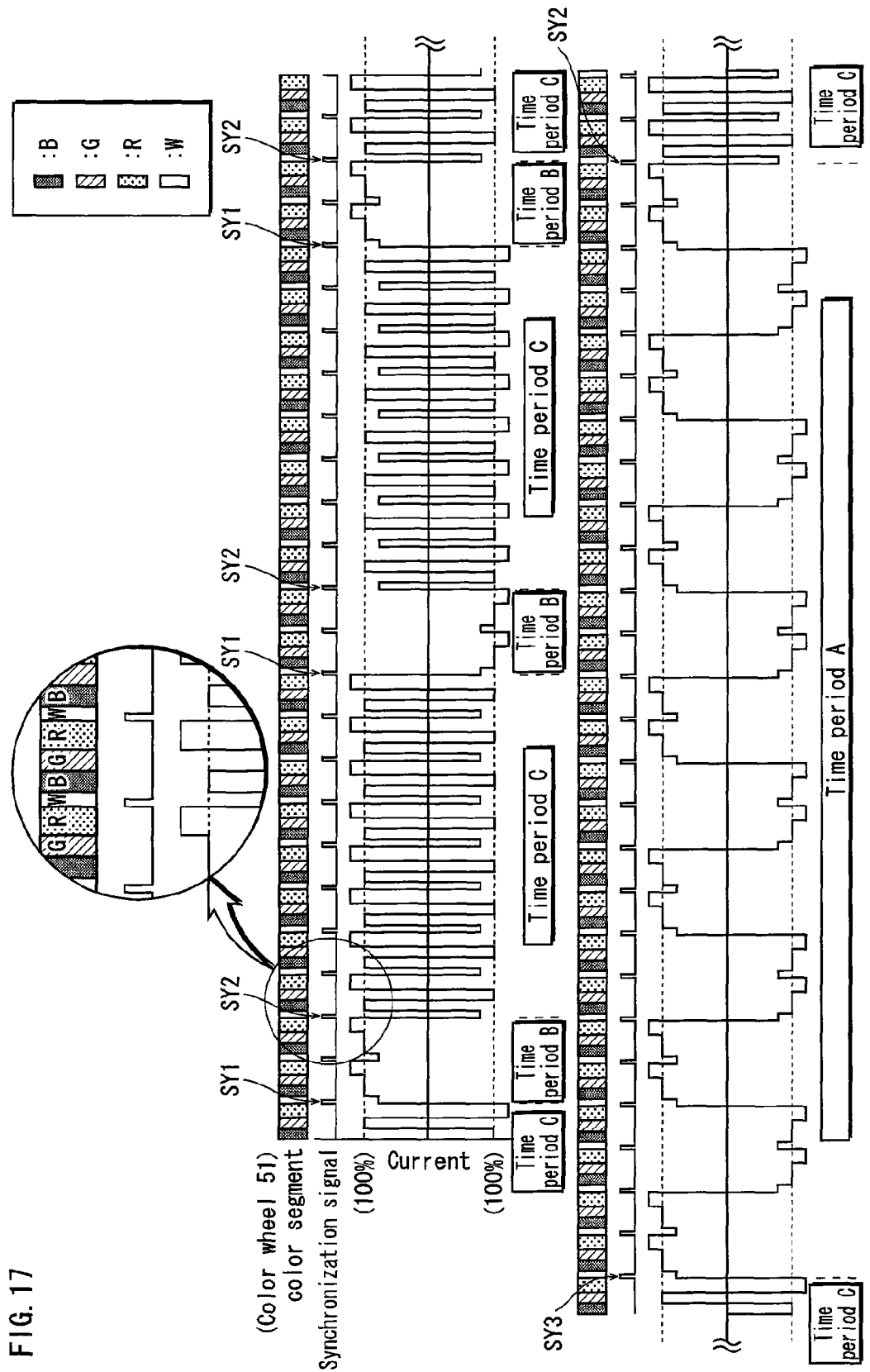
FIG. 17 shows an example of an alternating current waveform and a synchronization signal of the front projector according to the second embodiment.

Firstly, description will be made on the first synchronization method, with reference to FIG. 17. FIG. 17 shows synchronization signals which are generated at the timing at which each segment W of the color wheel 51 emerges. For better understandability, synchronization signals generated at the timings of each beginning of the time period B, the time period C, and the time period A while the alternating current is supplied are designated as SY1, SY2, and SY3, respectively in FIG. 17.

In the first synchronization method, in response to the synchronization signal SY1 shown in FIG. 17, the high-pressure discharge lamp lighting device 3 performs the polarity reversal operation via a program of the microcomputer 11 therein, causing the time period B to start. During the time period B, it also performs the current increasing and decreasing operations in accordance with the program. Since the time period B has only the length corresponding to 0.5 cycle in the present embodiment, the polarity reversal operation does not take place in the time period B. The rotation speed of the color wheel 51, as well as a duration over which the light passes through each segment, which is determined by the central angle of the each segment, are predetermined in the program. The timing at which the current is increased and decreased is set to correspond to the timing at which the each segment is switched. Subsequently, the high-pressure discharge lamp lighting device 3 causes the time period C to start in response to the synchronization signal SY2. During the time period C, it performs a series of the current increasing and decreasing operations and polarity reversal operations, in accordance with the program. Therefore, the polarity reversal operations in the time period C do not depend on synchronization signals. Then, the high-pressure discharge lamp lighting device 3 once again causes the time period B to start in response to the synchronization signal SY1, and repeats the above operations sequentially. After repeating the time periods B and the time periods C for the predetermined times as set by the program, it causes the time period A to start in response to the synchronization signal SY3. Thereafter the high-pressure discharge lamp lighting device 3 once again causes the time period C to start in response to the synchronization signal SY2, and repeats the time periods B and the time periods C as described above. After repeating the time periods B and the time periods C for the predetermined times as set by the program, it causes the time period A to start again. From there on it repeats the above series of operations.

Although, in the first synchronization method in the present embodiment, the generation timing of the synchronization signal is matched to the timing of the emergence of segment W by the control unit 38, it can be matched to the timing of the emergence of any color segment other than segment W. In that case, the operations similar to the above may be achieved by modifying the program of the microcomputer 11 in the high-pressure discharge lamp lighting device 3.

Also, although in the time periods A to C in the first synchronization method in the present embodiment, the current increase and decrease operations, as well as the polarity reversal operations are performed as a series of operations in accordance with not the synchronization signals but the predetermined program, the operations may be commenced in response to each synchronization signal in any of the time periods. In that case, the operations similar to the above may also be achieved by modifying the program of the microcomputer 11. In addition, a preferred waveform set in the program is not limited to the FIG. 15 waveform example, and it is also possible to configure the FIG. 13 and FIG. 14 waveform examples or any other alternating current waveform patterns using different current increasing and decreasing operations and polarity reversal operations by preliminarily specifying the program of the microcomputer 11 as such.

<Second Synchronization Method>

Figure 18:
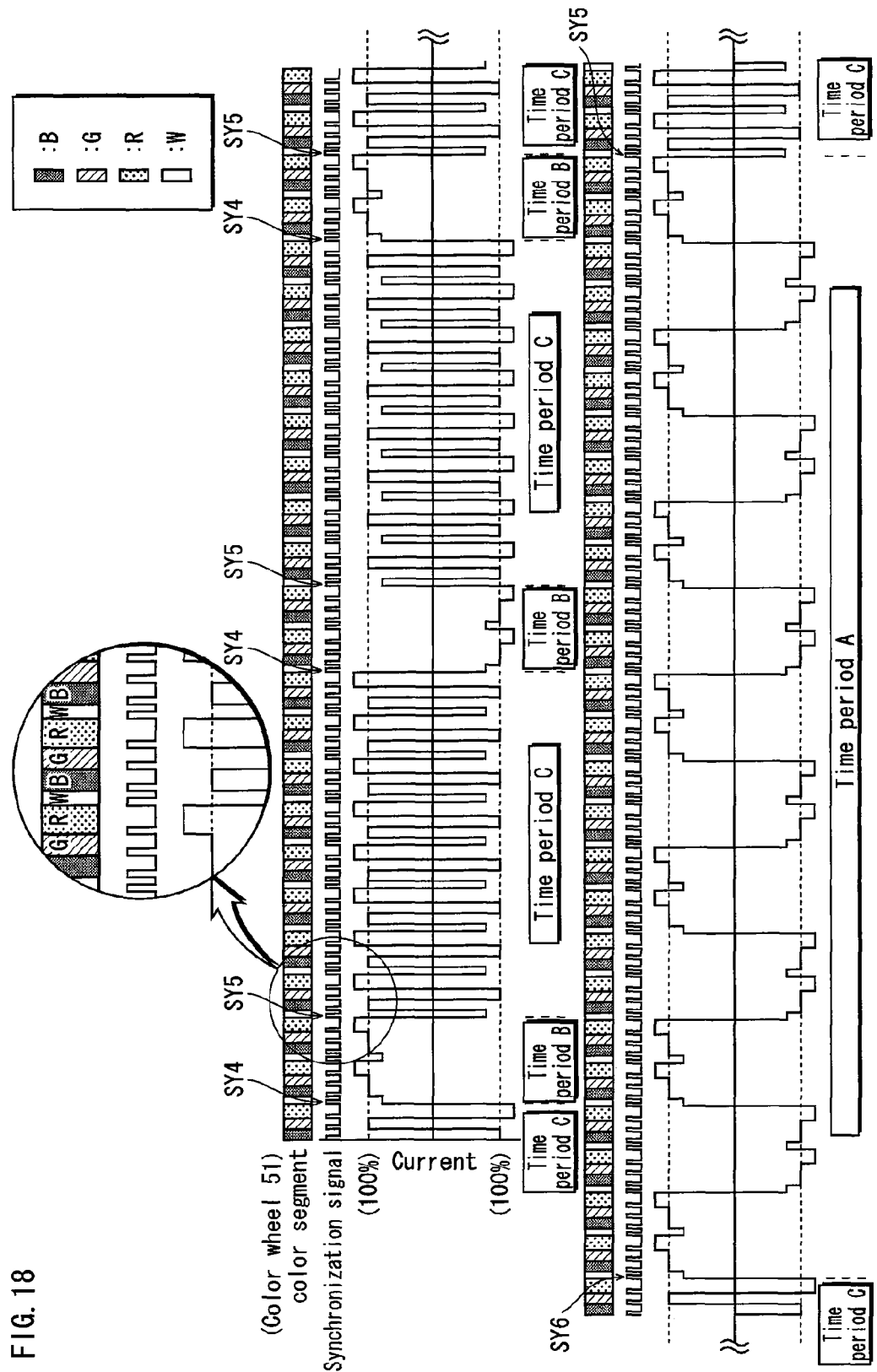
FIG. 18 shows an example of another alternating current waveform and a synchronization signal of the front projector according to the second embodiment.

Next, description will be made on a second synchronization method. FIG. 18 shows synchronization signals generated according to the timing of the emergence of each color segment. As similarly to FIG. 17, synchronization signals generated according to the timing of the beginning of the time period B, the time period C, and the time period A while the alternating current is supplied, are designated as SY4, SY5, and SY6 respectively in FIG. 18.

In the second synchronization method, the high-pressure discharge lamp lighting device 3 performs current increasing and decreasing operations and polarity reversal operations, both of which are predetermined by a program of the microcomputer 11 therein, in response to each synchronization signal shown in FIG. 18. The high-pressure discharge lamp lighting device 3 herein performs the operations in response to all the synchronization signals, but similarly to the above example in which the synchronization signals are generated each time the color wheel rotates, it is also possible for the high-pressure discharge lamp lighting device 3 not to respond to some of the synchronization signals. In that case, synchronization signals of the present embodiment are not limiting, and it is also possible to adjust the timing of the current increasing and decreasing operations and polarity reversal operations to match to the timing of the switching of each segment of the color wheel 51, by preliminarily specifying in the program the rotation speed of the color wheel 51, as well as a duration over which the light passes through each segment, which is determined by the central angle of the each segment.

Thus, as the concrete examples of the synchronization method, we have looked at the first synchronization method in which synchronization signals are generated each time the color wheel rotates, and the second synchronization method in which synchronization signals are generated everytime the each segment of the color wheel is switched. In addition, the structure of the color wheel, the method for increasing and decreasing the current in each segment, and the alternating current waveform are not limited to the above-mentioned structures in the synchronization methods of the present embodiment.

It is optional which method is adopted, depending on the specification and usage of the projector. Nevertheless, the first synchronization method has the following advantages compared with the second synchronization method. Firstly, the first synchronization method only requires to adjust the synchronization signals to be generated each time the color wheel rotates. Accordingly, compared with the second synchronization method in which the synchronization signals are generated in accordance with the timing of switching of the each segment of the color wheel, the first synchronization method is simple and needs a smaller number of components, therefore less expensive to manufacture.

Secondly, the first synchronization method is more advantageous for the following reason. There is a recent trend that the rotation of a color wheel tends to become more rapid and that the interval of two synchronization signals tends to become smaller, in order to reduce a color breakup phenomenon (i.e. a rainbow effect with multi-color noise briefly noticeable due to each color segment switched in a temporal sequence) which is unique to a single panel DLP type projector. More particularly, in order to cope with the rapid rotation of the color wheel, it is necessary for a circuit in the control unit 38 operable to send the synchronization signals to increase the accuracy of the sending, and for a circuit in the high-pressure discharge lamp lighting device operable to receive the synchronization signals to increase the accuracy of receiving. Since the first synchronization method has the simple structure, it allows the above accuracy to be achieved easily and less expensively. Further, there is another trend that more and more colors are used in the color wheel, resulting in the increase in the number of the segments. Since the first synchronization method does not depend on the number of the segments of the color wheel, it is easier and less expensive to manufacture than the second synchronization method.

Thirdly, since the first synchronization method has a circuit that is configured simpler than the second synchronization method, the first synchronization method is able to suppress the excessive occurrence of the above current increasing and decreasing operations. This is advantageous because of the following reason: the more complex the circuit operable to send and receive the synchronization signals become, the more likely it is for the polarity reversal operations and current increasing and decreasing operations of the current of the lamp lighting device to malfunction, because of the increased possibility of improper operations due to the deterioration and defect of the components, or a disturbance and the like.

<Rear Projector>

Figure 19:
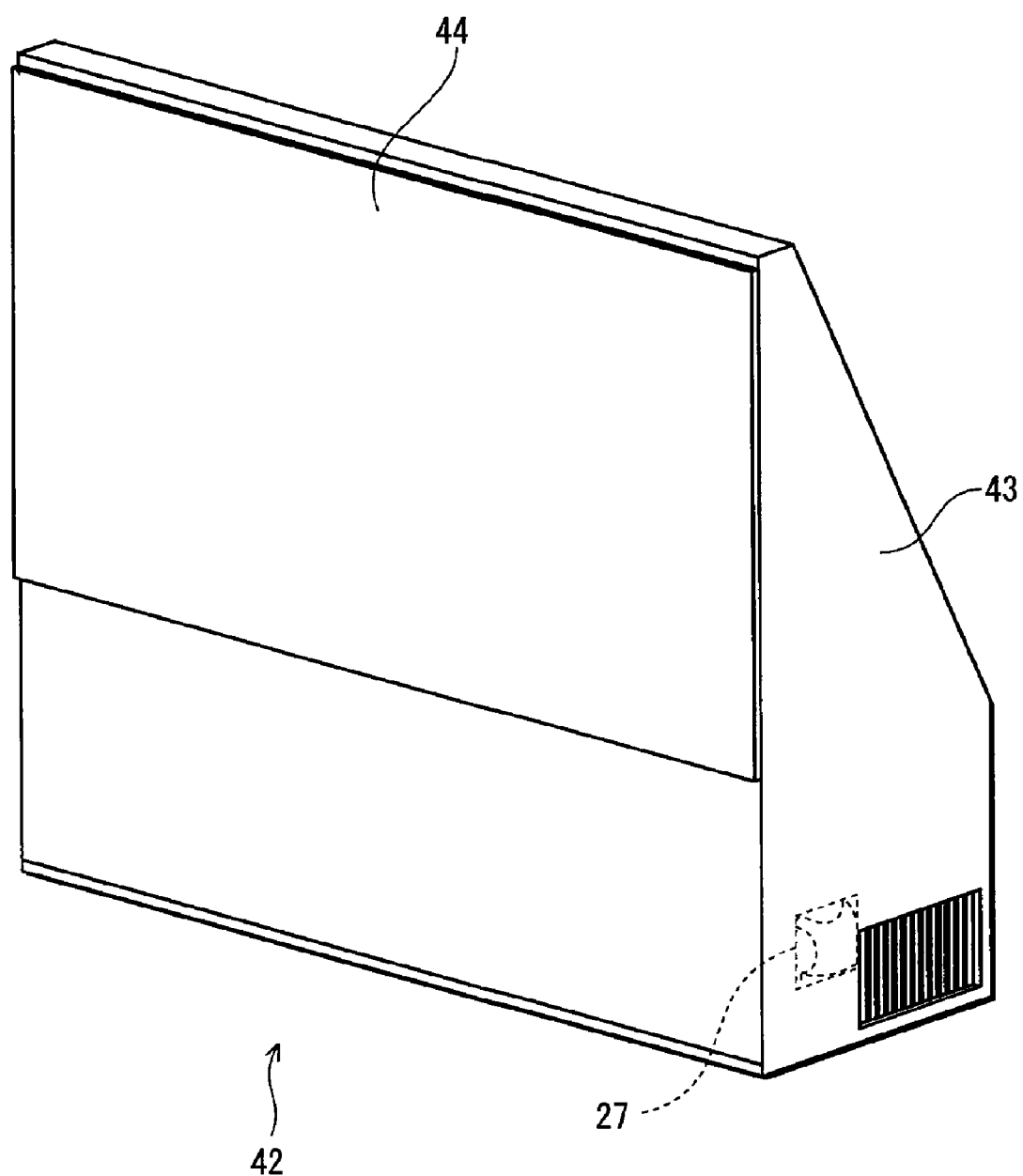
FIG. 19 is a perspective view showing a rear projector for a projector according to the embodiments 1 and 2.

The high-pressure discharge lamp apparatus 1 according to the above first and second embodiments may also be used as a light source of a rear projector 42, an example of a projection type image display device, as shown in FIG. 19. The rear projector 42 includes a lamp unit 27, an optical unit, a projection lens, a mirror, and a high-pressure discharge lamp lighting device and others (none of which are shown) housed in an outer case 43. Images projected through the projection lens and reflected by the mirror are then projected from behind a transparent screen 44 to be displayed.

Although the description has been made on the high-pressure discharge lamp lighting device, the high-pressure discharge lamp apparatus using this, the projector using the high-pressure discharge lamp apparatus, and the high-pressure discharge lamp lighting method according to the present invention in accordance with the embodiments, the present invention is not limited to the embodiments. For example, the following modifications may be envisaged.

<Modification>

(1) Although the time period B and the time period C are alternately repeated, and the frequency of the alternating current is switched between two values in the predetermined time E after the time period A, it is also possible to add, for example, a fourth value and a fifth value and switch the frequency among at least three values in turn. In that case, the time period C may have a length corresponding to an odd number of 0.5 cycles. As long as the current in one time period B has an opposite phase to the current in a previous time period B, the length of the time period C, the length of the time period in which the alternating current of the fourth value is supplied, and the length of the time period in which the alternating current of the fifth value is supplied may be adjusted with respect to one another. The length herein means the setting of the number of cycles, which determines the length of time.

(2) Although the time period C occurs respectively before and after each time period A in the above embodiment, other structures, such as a structure in which the time period B occurs either before or after each time period A, may be used.

(3) Although the high-pressure mercury lamp 4 of a 180 W rated power is used in the description of the each of the above embodiments, other high-pressure mercury lamps of any rated power in a range from 80 to 1000 W inclusive may be used to achieve the effects similar to the above. In that case, the lamp current during constant current control is not limited to 3 A and determined variously in accordance with the design of the high-pressure mercury lamp. The lamp voltage at which constant power control is started is also not limited to 60 V as above, and determined in accordance with the various lamp currents during constant current control and constant power values.

(4) The high-pressure mercury lamp 4 is used as a concrete example of the high-pressure discharge lamp in each of the above embodiments, but other lamps, such as a well-known short-arc metal halide lamp may be used to achieve the effects similar to the above.

(5) Some of the recent high-pressure discharge lamp apparatus 1 of this kind include a brightness control function that switches the lamp power in steps in accordance with the size of the space in which it is used. In other words, in such apparatus, constant power control over the lamp with a constant power of, for example, 180 W is performed in a normal mode, whereas the lamp power is adjusted to a constant power of, for example, 100 W in a brightness control mode. In case the high-pressure discharge lamp apparatus 1 according to each of the embodiments includes the brightness control function, when the lamp is running in the normal mode, the above "constant power" means the constant power in the normal mode and, when the lamp is running in the brightness control mode, the "constant power" means the constant power in the brightness control mode, respectively.

INDUSTRIAL APPLICABILITY

The present invention may be applied broadly in projectors and the like.

The invention claimed is:

1. A high-pressure discharge lamp lighting device that supplies an alternating current to a high-pressure discharge lamp to cause lighting, the high-pressure discharge lamp having an arc tube in which a halogen material is enclosed and a pair of electrodes is disposed opposite to each other, each electrode having a protuberance at a tip thereof, comprising:

a frequency switch unit operable to switch a frequency of the alternating current to be supplied to the high-pressure discharge lamp among (i) a first frequency, (ii) a second frequency greater than the first frequency, and (iii) a third frequency smaller than or equal to the first frequency; and a control unit operable to control the frequency switch unit so that (a) a time period A, in which the alternating current of the third frequency is supplied, occurs at the beginning of each of predetermined time intervals, and (b) a remainder of each of the predetermined time intervals includes (i) a time period B, in which the alternating current of the first frequency is supplied, and (ii) a time period C, in which the alternating current of the second frequency is supplied, the time period B and the time period C being alternately repeated, wherein the time period A is longer than the time period B, and has a length corresponding to a predetermined number of cycles of the alternating current of the third frequency, ranging from 5.5 to 50 cycles inclusive.

2. The high-pressure discharge lamp lighting device according to claim 1, wherein the control unit controls the frequency switch unit so that, in each of the predetermined time intervals, (i) the time period A is followed by the time period C, (ii) subsequently the time period B and the time period C are alternately repeated, and (iii) the time period C then terminates the predetermined time interval.

3. The high-pressure discharge lamp lighting device according to claim 1, wherein the first frequency lies in a range from 20 to 200 Hz inclusive.

4. The high-pressure discharge lamp lighting device according to claim 3, wherein the time period B has a length corresponding to a predetermined number of cycles of the alternating current of the first frequency, ranging from 0.5 to 10 cycles inclusive.

5. The high-pressure discharge lamp lighting device according to claim 1, wherein the second frequency lies in a range from 300 to 1000 Hz inclusive.

6. The high-pressure discharge lamp lighting device according to claim 1, wherein the second frequency means an average value of a plurality of frequencies each selected in a range from 210 to 1000 Hz inclusive with respect to each 0.5 cycle, and the average value lies in a range from 300 to 1000 Hz inclusive.

7. The high-pressure discharge lamp lighting device according to claim 5, wherein the time period C has a length corresponding to a predetermined number of cycles of the alternating current of the second frequency, ranging from 2 to 200 cycles inclusive.

8. The high-pressure discharge lamp lighting device according to claim 1, wherein the third frequency lies in a range from 15 to 150 Hz.

9. The high-pressure discharge lamp lighting device according to claim 8, wherein each of the predetermined time intervals lies in a range from 1 to 300 seconds inclusive, and the time period A occurs at the beginning of each of the predetermined time intervals.

10. The high-pressure discharge lamp lighting device according to claim 1, wherein the control unit controls the frequency switch unit so that the predetermined time interval includes more than one time periods B, and that an alternating current in each of the plurality of time periods B has an opposite phase alternately in order of occurrence of the time periods B.

11. The high-pressure discharge lamp lighting device according to claim 1, wherein the control unit controls the frequency switch unit so that an alternating current in each of the time periods A has an opposite phase alternately in order of occurrence of the time periods A.

12. A high-pressure discharge lamp apparatus, comprising:

a high-pressure discharge lamp having an arc tube in which a halogen material is enclosed and a pair of electrodes is disposed opposite to each other, each electrode having a protuberance at a tip thereof; and the high-pressure discharge lamp lighting device according to claim 1 operable to cause the high-pressure discharge lamp to light.

13. A projector comprising the high-pressure discharge lamp apparatus according to claim 12.

14. A high-pressure discharge lamp lighting method for supplying an alternating current to a high-pressure discharge lamp to cause lighting, the high-pressure discharge lamp having an arc tube in which a halogen material is enclosed and a pair of electrodes is disposed opposite to each other, and each electrode having a protuberance at a tip thereof, wherein while a frequency of the alternating current is switched among (i) a first frequency, (ii) a second frequency greater than the first frequency, and (iii) a third frequency smaller than or equal to the first frequency, (a) the frequency is switched to the third frequency at predetermined time intervals, to cause a time period A, in which the alternating current of the third frequency is supplied, to occur at the beginning of each of the predetermined time intervals, (b) a remainder of each of the predetermined time intervals includes (i) a time period B, in which the alternating current of the first frequency is supplied, and (ii) a time period C, in which the alternating current of the second frequency is supplied, the time period B and the time period C being alternately repeated, and (c) the time period A is longer than the time period B, and has a length corresponding to a predetermined number of cycles of the alternating current of the third frequency, ranging from 5.5 to 50 cycles inclusive.

15. The high-pressure discharge lamp lighting method according to claim 14, wherein in each of the predetermined time intervals, the time period A is followed by the time period C, subsequently the time period B and the time period C are alternately repeated, and the time period C then terminates the predetermined time interval.

16. The high-pressure discharge lamp lighting method according to claim 14, wherein the predetermined time interval includes more than one time periods B, and an alternating current in each of the plurality of time periods B has an opposite phase alternately in order of occurrence of the time periods B.

17. The high-pressure discharge lamp lighting method according to claim 14, wherein an alternating current in each of the time periods A has an opposite phase alternately in order of occurrence of the time periods A.

* * * * *